United States Patent
Naoi et al.

(10) Patent No.: US 12,300,803 B2
(45) Date of Patent: May 13, 2025

(54) DOPING SYSTEM AND DOPING METHOD

(71) Applicant: MUSASHI ENERGY SOLUTIONS CO., LTD., Hokuto (JP)

(72) Inventors: Masaya Naoi, Minato-ku (JP); Kenji Kojima, Minato-ku (JP); Kazunari Aita, Minato-ku (JP)

(73) Assignee: MUSASHI ENERGY SOLUTIONS CO., LTD., Hokuto (JP)

(*) Notice: Subject to any disclaimer, the term of this patent is extended or adjusted under 35 U.S.C. 154(b) by 811 days.

(21) Appl. No.: 17/424,572

(22) PCT Filed: Nov. 29, 2019

(86) PCT No.: PCT/JP2019/046830
§ 371 (c)(1),
(2) Date: Jul. 21, 2021

(87) PCT Pub. No.: WO2020/152986
PCT Pub. Date: Jul. 30, 2020

(65) Prior Publication Data
US 2022/0077448 A1  Mar. 10, 2022

(30) Foreign Application Priority Data
Jan. 23, 2019 (JP) ................................. 2019-009585

(51) Int. Cl.
*H01M 4/04* (2006.01)
*H01G 11/50* (2013.01)
(Continued)

(52) U.S. Cl.
CPC .......... *H01M 4/0459* (2013.01); *H01G 11/50* (2013.01); *H01G 11/86* (2013.01); *H01M 4/139* (2013.01); *H01M 10/0525* (2013.01)

(58) Field of Classification Search
CPC .............. H01M 4/0459; H01M 4/139; H01M 10/0525; H01G 11/50; H01G 11/86;
(Continued)

(56) References Cited

U.S. PATENT DOCUMENTS 11,170,947 B2 * 11/2021 Naoi ................. H01M 10/0585
11,811,046 B2 * 11/2023 Aita ..................... H01M 4/0459
(Continued)

FOREIGN PATENT DOCUMENTS

CN 102598366 A * 7/2012 ............. C23C 16/24
CN 108701553 A   10/2018
(Continued)

OTHER PUBLICATIONS

Chinese Office Action issued Dec. 16, 2023 in Chinese Patent Application No. 201980089878.8 (with unedited computer-generated English translation), 11 pages.
(Continued)

*Primary Examiner* — Abdullah A Riyami
*Assistant Examiner* — Nader J Alhawamdeh
(74) *Attorney, Agent, or Firm* — Oblon, McClelland, Maier & Neustadt, L.L.P.

(57) ABSTRACT

A doping system dopes an active material with an alkali metal, the active material being contained in a layer of a strip-shaped electrode. The doping system includes a doping bath, a conveyor unit, a counter electrode unit, a connection unit, and a recovery unit. The doping bath stores a solution containing alkali metal ions. The conveyor unit conveys the electrode along a path passing through the doping bath. The counter electrode unit is housed in the doping bath. The connection unit electrically connects a conveyor roller provided in the conveyor unit with the counter electrode unit.
(Continued)

The recovery unit collects in the doping bath the solution adhered to the electrode having passed through the doping bath.

22 Claims, 11 Drawing Sheets

(51) Int. Cl.
*H01G 11/86* (2013.01)
*H01M 4/139* (2010.01)
*H01M 10/0525* (2010.01)

(58) Field of Classification Search
CPC ........ H01G 11/14; H01G 11/06; H01G 13/04; H01G 13/00; Y02E 60/10
See application file for complete search history.

(56) References Cited

U.S. PATENT DOCUMENTS

| | | | |
|---|---|---|---|
| 2012/0018309 A1* | 1/2012 | Min ..................... | C25D 21/12 204/229.8 |
| 2019/0074143 A1* | 3/2019 | Naoi ................. | H01M 10/0587 |
| 2021/0159484 A1* | 5/2021 | Yakushiji ............ | H01M 4/0416 |
| 2021/0384486 A1* | 12/2021 | Iwazaki ................. | B05C 13/02 |
| 2022/0020538 A1* | 1/2022 | Otani ................. | H01M 4/0459 |
| 2022/0037634 A1* | 2/2022 | Aita ........................ | B05C 3/132 |
| 2022/0077448 A1* | 3/2022 | Naoi ..................... | H01G 11/86 |
| 2022/0085350 A1* | 3/2022 | Yakushiji ............... | H01G 11/86 |
| 2022/0158156 A1* | 5/2022 | Naoi ..................... | H01M 4/049 |
| 2022/0173375 A1* | 6/2022 | Aono ........................ | H01G 11/50 |
| 2022/0302434 A1* | 9/2022 | Suzuki .................. | H01M 4/139 |
| 2022/0320482 A1* | 10/2022 | Miyauchi .............. | H01M 4/583 |
| 2023/0022630 A1* | 1/2023 | Aita ........................ | H01G 11/50 |
| 2023/0042598 A1* | 2/2023 | Naoi ....................... | H01G 11/86 |
| 2023/0045995 A1* | 2/2023 | Chiba .................. | H01M 4/0416 |
| 2024/0014369 A1* | 1/2024 | Yakushiji ............ | H01M 4/0404 |

FOREIGN PATENT DOCUMENTS

| | | | | |
|---|---|---|---|---|
| JP | 10-308212 | A | | 11/1998 |
| JP | 2005-123175 | A | | 5/2005 |
| JP | 2006-107795 | A | | 4/2006 |
| JP | 2008-16199 | A | | 1/2008 |
| JP | 2008-77963 | A | | 4/2008 |
| JP | 2009-246137 | A | | 10/2009 |
| JP | 2012-49543 | A | | 3/2012 |
| JP | 2012-49544 | A | | 3/2012 |
| JP | 2013-258392 | A | | 12/2013 |
| KR | 96-25014 | U | | 7/1996 |
| KR | 10-2018-0114063 | A | | 10/2018 |
| KR | 20180114063 | A | * 10/2018 | .......... H01M 4/1393 |
| WO | WO-2017146223 | A1 | * 8/2017 | ............. H01G 11/06 |

OTHER PUBLICATIONS

Combined Chinese Office Action and Search Report issued on Jun. 10, 2023 in Chinese Patent Application No. 201980089878.8 (with English translation of Office Action), 17 pages.

Extended European Search Report issued Oct. 14, 2022, in corresponding European Patent Application No. 19911712.8, 8 pages.

Chinese Notice of Reasons for Rejection issued Apr. 27, 2024 in Chinese Patent Application No. 201980089878.8 (with unedited computer-generated English Translation), 18 pages.

Korean Office Action issued Dec. 5, 2024 in Korean Patent Application No. 10-2021-7026167 with English machine-generated translation, 13 pgs.

* cited by examiner

DOPING SYSTEM AND DOPING METHOD

CROSS-REFERENCE TO RELATED APPLICATION

This international application claims the benefit of Japanese Patent Application No. 2019-009585 filed on Jan. 23, 2019 with the Japan Patent Office, and the entire disclosure of Japanese Patent Application No. 2019-009585 is incorporated herein by reference.

TECHNICAL FIELD

The present disclosure relates to a doping system and a doping method.

BACKGROUND ART

In recent years, reduction in size and weight of electronic devices has been remarkable, and thus, there has been an increased demand for reduction in size and weight of batteries to be used as power supplies for driving such electronic devices.

In order to meet the demand for reduction in size and weight, non-aqueous electrolyte rechargeable batteries, as typified by lithium-ion rechargeable battery, have been developed. Also, lithium ion capacitors are known as power storage devices available for uses requiring high energy density characteristics and high output characteristics. Further known are sodium ion batteries and capacitors using sodium which is lower in cost and more abundant as a natural resource than lithium.

For these batteries and capacitors, a process of previously doping an electrode with an alkali metal (generally referred to as pre-doping) is adopted for various purposes. Methods for pre-doping an electrode with an alkali metal include, for example, a continuous method. In the continuous method, pre-doping is performed while transferring a strip-shaped electrode in a dope solution. The continuous method is disclosed in Patent Documents 1 to 4.

PRIOR ART DOCUMENTS

Patent Documents

Patent Document 1: Japanese Unexamined Patent Application Publication No. H10-308212
Patent Document 2: Japanese Unexamined Patent Application Publication No. 2008-77963
Patent Document 3: Japanese Unexamined Patent Application Publication No. 2012-49543
Patent Document 4: Japanese Unexamined Patent Application Publication No. 2012-49544

SUMMARY OF THE INVENTION

Problems to be Solved by the Invention

When pre-doping is performed, a strip-shaped electrode is conveyed along a path passing through a doping bath where a dope solution is stored. After the electrode passes through the doping bath, the dope solution adheres to the electrode. That is, the electrode carries away the dope solution from the doping bath. If a large amount of the dope solution is carried away from the doping bath by the electrode, an amount of the dope solution to be used is increased.

In one aspect of the present disclosure, it is preferable to provide a doping system and a doping method that are capable of reducing an amount of a dope solution carried away from the doping bath by the electrode.

Means for Solving the Problems

One aspect of the present disclosure provides a doping method of doping an active material with an alkali metal using a doping system, the active material being contained in a layer of a strip-shaped electrode. The doping system comprises a doping bath configured to store a solution containing alkali metal ions, a conveyor unit configured to convey the electrode along a path passing through the doping bath, a counter electrode unit configured to be housed in the doping bath, a connection unit configured to electrically connect a conveyor roller provided in the conveyor unit with the counter electrode unit, and a recovery unit configured to collect in the doping bath the solution adhered to the electrode having passed through the doping bath.

The doping method according to one aspect of the present disclosure employs the doping system including the recovery unit. Thus, the doping method according to one aspect of the present disclosure enables reduction in an amount of the dope solution carried away from the doping bath by the electrode.

Another aspect of the present disclosure provides a doping system doping an active material with an alkali metal, the active material being contained in a layer of a strip-shaped electrode. The doping system comprises a doping bath configured to store a solution containing alkali metal ions, a conveyor unit configured to convey the electrode along a path passing through the doping bath, a counter electrode unit configured to be housed in the doping bath, a connection unit configured to electrically connect a conveyor roller provided in the conveyor unit with the counter electrode unit, and a recovery unit configured to collect in the doping bath the solution adhered to the electrode having passed through the doping bath.

The doping system according to another aspect of the present disclosure comprises the recovery unit, thereby enabling reduction in an amount of the dope solution carried away from the doping bath by the electrode.

EXPLANATION OF REFERENCE NUMERALS

1 . . . electrode; 3 . . . current collector; 5 . . . active material layer; 11 . . . doping system; 15 . . . electrolyte solution treatment bath; 17, 19, 21 . . . doping bath; 23 . . . cleaning bath; 25, 27, 29, 31, 33, 35, 37, 37, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 . . . conveyor roller; 101 . . . supply roll; 103 . . . winding roll; 105 . . . support; 107 . . . circulation filtration unit; 109, 110, 111, 112, 113, 114 . . . power supply; 117 . . . tub cleaner; 119, 203, 205, 245 . . . recovery unit; 121 . . . end portion sensor; 131 . . . upstream bath; 133 . . . downstream bath; 137, 139, 141, 143 . . . counter electrode unit; 149, 151 . . . space; 153 . . . conductive base material; 155 . . . alkali metal-containing plate; 157 . . . porous insulating member; 161 . . . filter; 163 . . . pump; 165 . . . pipe; 171 . . . fixed portion; 173 . . . rotating portion; 175, 211, 221, 223, 251, 265, 267, 269, 271 . . . support plate; 177, 191, 213, 215, 225, 227, 253, 255, 257, 259, 273, 275, 277, 279 . . . removal roll; 179 . . . transfer roll; 181 . . . liquid discharging roll; 183 . . . scraper; 183A . . . tip end; 185 . . . droplet guide; 187, 217, 235, 239, 261, 291, 295, 297, 299 . . . rotational shaft; 189 . . . support plate; 189A . . . main body portion; 189B . . . lever portion; 193 . . . transfer roll; 195 . . . liquid discharging roll; 197 . . . scraper; 197A . . . tip end; 199 . . . droplet guide; 207 . . . first portion; 209 . . . second portion; 229, 231, 281, 283, 285, 287 . . . spring; 221A . . . main body portion; 221B . . . lever portion; 241, 243 . . . droplet guide; 247 . . . first portion; 249 . . . second portion; 265A . . . main body portion; 265B . . . lever portion; 267A . . . central portion; 267B . . . first arm portion; 267C . . . second arm portion

MODE FOR CARRYING OUT THE INVENTION

Example embodiments of the present disclosure will be described with reference to the drawings.

First Embodiment

1. Configuration of Electrode 1

Figure 1:
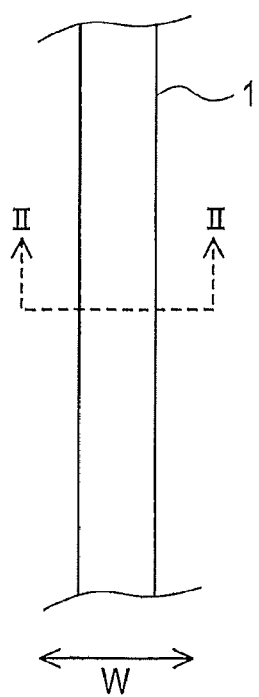
FIG. 1 is a plan view showing a configuration of an electrode.
Figure 2:
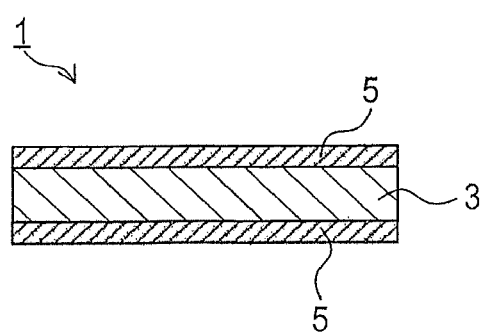
FIG. 2 is a sectional view taken along the line II-II in FIG. 1.

A configuration of an electrode 1 will be described with reference to FIG. 1 and FIG. 2. The electrode 1 has a strip-like shape. The electrode 1 comprises a current collector 3 and active material layers 5. The current collector 3 has a strip-like shape. The active material layers 5 are each formed on both sides of the current collector 3.

The current collector 3 is preferably a metal foil made of, for example, copper, nickel, stainless steel, or the like. Further, the current collector 3 may include a conductive layer arranged on the metal foil and made of a carbon material as a main component. The thickness of the current collector 3 is, for example, 5 to 50 µm.

For example, the active material layer 5 can be prepared by applying a slurry containing an active material, a binder, and the like onto the current collector 3, and then drying it.

Examples of the binder include rubber-based binders, such as styrene-butadiene rubber (SBR) or NBR; fluorine resins, such as polytetrafluoroethylene, polyvinylidene fluoride; polypropylene, polyethylene, and fluorine modified (meth) acrylic binders as disclosed in Japanese Unexamined Patent Application Publication No. 2009-246137.

The slurry may contain other components in addition to the active material and the binder. Examples of the other components include conductive agents, such as carbon black, graphite, vapor-grown carbon fiber, and metal particles; and thickening agents, such as carboxymethyl cellulose, Na salt or ammonium salt thereof, methyl cellulose, hydroxymethyl cellulose, ethyl cellulose, hydroxypropyl cellulose, polyvinyl alcohol, oxidized starch, phosphorylated starch, and casein.

The thickness of the active material layer 5 is not limited to a particular value. The thickness of the active material layer ranges, for example, from 5 to 500 µm, preferably from 10 to 200 µm, or more preferably from 10 to 100 µm. The active material contained in the active material layer 5 can be any electrode active materials applicable to a battery or a capacitor that uses insertion/desorption of alkali metal ions. Such active materials may be a negative electrode active material or a positive electrode active material.

The negative electrode active material is not limited to a particular material. Examples of the negative electrode active material include carbon materials, such as graphite, easily graphitizable carbon, hardly graphitized carbon, or a composite carbon material composed of graphite particles coated with a carbide of a pitch or a resin; and materials containing metals or semimetals that can be alloyed with lithium, such as Si and Sn, or the oxides thereof. A specific example of the carbon material is the carbon material described in Japanese Unexamined Patent Application Publication No. 2013-258392. Specific examples of materials containing metals or semimetals that can be alloyed with lithium or oxides thereof are the materials described in Japanese Unexamined Patent Application Publication Nos. 2005-123175 and 2006-107795.

Examples of the positive electrode active material include transition metal oxides, such as cobalt oxide, nickel oxide, manganese oxide, and vanadium oxide; and sulfur active materials, such as elemental sulfur and metal sulfide. The positive electrode active material and the negative electrode active material may each be composed of a single substance or a mixture of two or more substances.

The active material contained in the active material layer 5 is pre-doped with an alkali metal by using a doping system 11, which will be described below. The alkali metal for pre-doping the active material is preferably lithium or sodium, especially lithium. In a case where the electrode 1 is used for production of electrodes of lithium-ion rechargeable batteries, a density of the active material layer 5 is preferably 1.50 to 2.00 g/cc, especially 1.60 to 1.90 g/cc.

2. Configuration of Doping System 11

Figure 3:
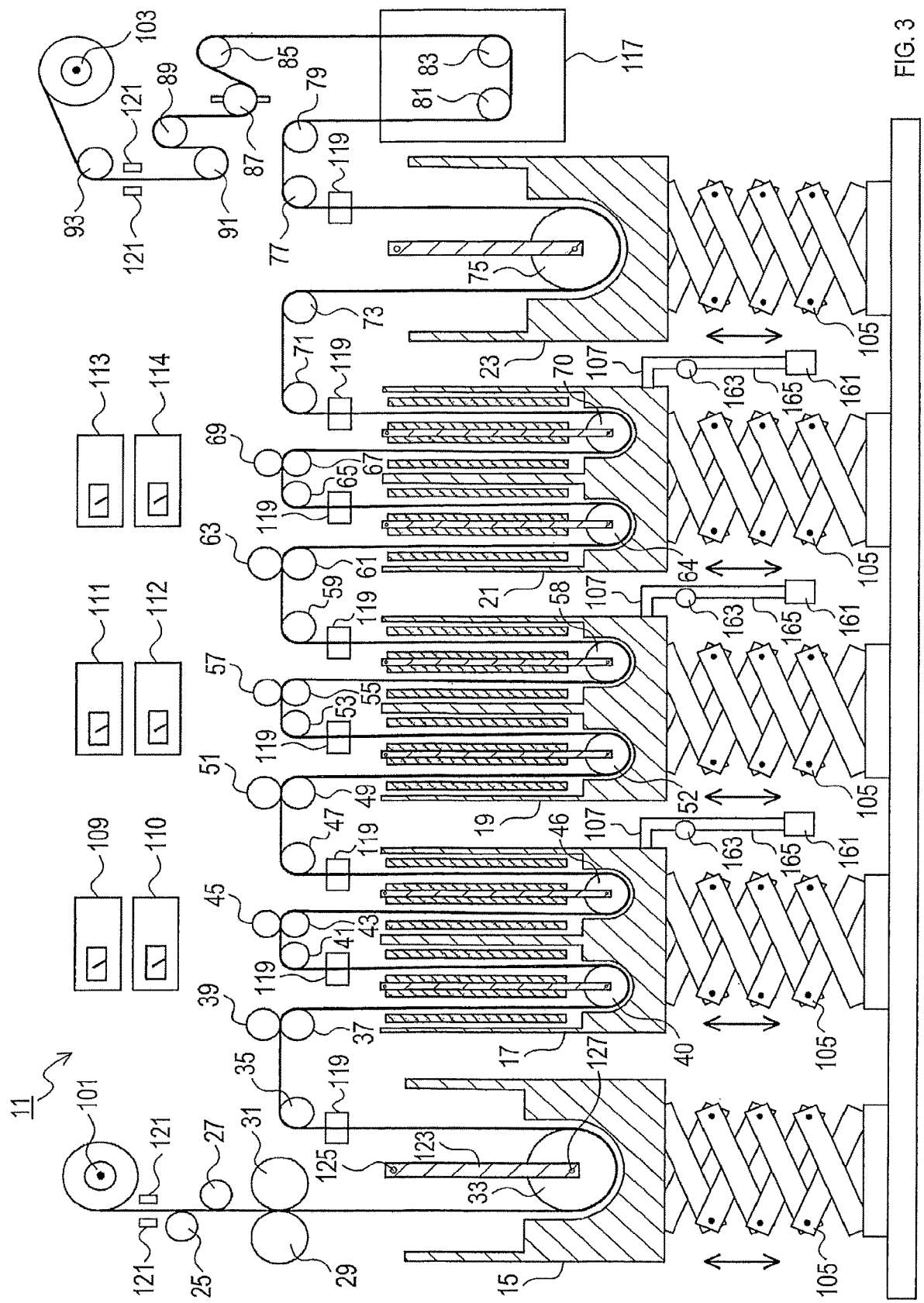
FIG. 3 is an explanatory view showing a configuration of a doping system.
Figure 4:
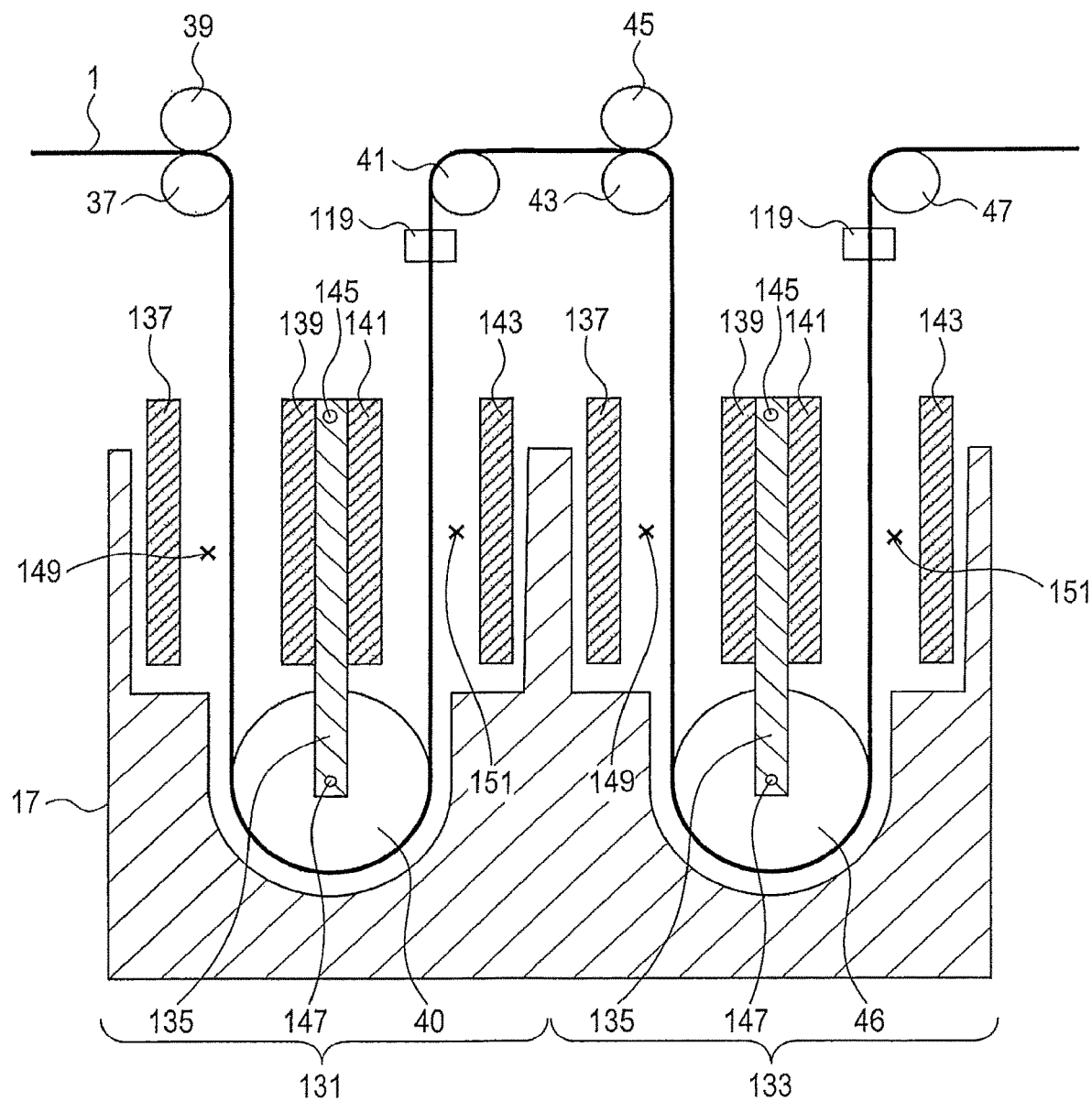
FIG. 4 is an explanatory view showing a configuration of a doping bath.
Figure 5:
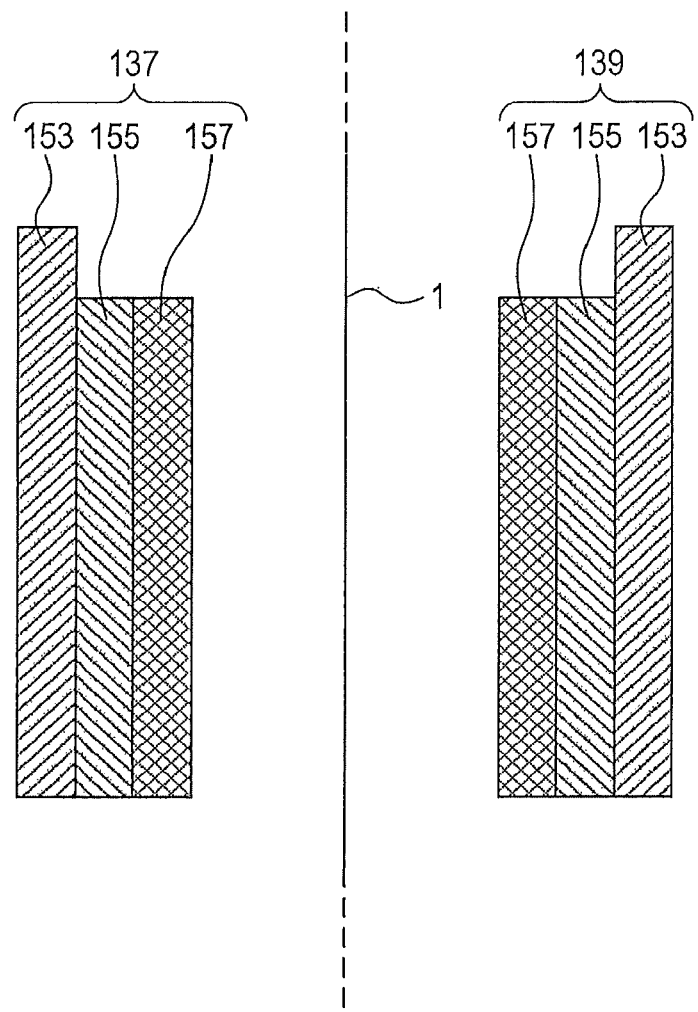
FIG. 5 is an explanatory view showing a configuration of a counter electrode unit.

A configuration of the doping system 11 will be described with reference to FIG. 3 to FIG. 5. As shown in FIG. 3, the doping system 11 includes an electrolyte solution treatment bath 15, doping baths 17, 19, 21, a cleaning bath 23, conveyor rollers 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 (hereinafter also collectively referred to as a "conveyor roller group"), a supply roll 101, a winding roll 103, supports 105, circulation filtration units 107, six power supplies 109, 110, 111, 112, 113, 114, and a tub cleaner 117, recovery units 119, and end portion sensors 121.

The conveyor roller group corresponds to conveyor units. The power supplies 109, 110, 111, 112, 113, 114 correspond to connection units. In this specification, a "roller" means a rotating element that is used for conveying the electrode 1. A "roll" means a cylindrical body except for the roller.

The electrolyte solution treatment bath 15 is a rectangular bath with an opening on an upper side. The electrolyte solution treatment bath 15 includes a bottom surface having a generally U-shaped section. The electrolyte solution treatment bath 15 comprises a partition plate 123. The partition plate 123 is supported by a support rod 125 penetrating an upper end of the partition plate 123. The support rod 125 is fixed to a wall or the like (not shown). The partition plate 123 extends vertically, and divides an inside of the electrolyte solution treatment bath 15 into two spaces.

The conveyor roller 33 is attached to a lower end of the partition plate 123. The partition plate 123 and the conveyor roller 33 are penetrated and supported by a support rod 127. The partition plate 123 includes a cutout in a vicinity of the lower end thereof to avoid contact with the conveyor roller 33. There is a space between the conveyor roller 33 and the bottom surface of the electrolyte solution treatment bath 15.

A configuration of the doping bath 17 will be described with reference to FIG. 4. The doping bath 17 comprises an upstream bath 131 and a downstream bath 133. The upstream bath 131 is arranged on a supply roll 101 side (hereinafter referred to as an "upstream side"), and the downstream bath 133 is arranged on a winding roll 103 side (hereinafter referred to as a "downstream side").

First, a configuration of the upstream bath 131 is described. The upstream bath 131 is a rectangular bath with an opening on an upper side. The upstream bath 131 includes a bottom surface having a generally U-shaped section. The upstream bath 131 comprises a partition plate 135 and four counter electrode units 137, 139, 141, 143.

The partition plate 135 is supported by a support rod 145 penetrating an upper end of the partition plate 135. The support rod 145 is fixed to a wall or the like (not shown). The partition plate 135 extends vertically, and divides an inside of the upstream bath 131 into two spaces. The conveyor roller 40 is attached to a lower end of the partition plate 135. The partition plate 135 and the conveyor roller 40 are penetrated and supported by a support rod 147. The partition plate 135 includes a cutout in a vicinity of the lower end to avoid contact with the conveyor roller 40. There is a space between the conveyor roller 40 and the bottom surface of the upstream bath 131.

The counter electrode unit 137 is arranged on the upstream side in the upstream bath 131. The counter electrode units 139, 141 are arranged to hold the partition plate 135 from both sides. The counter electrode unit 143 is arranged on the downstream side in the upstream bath 131.

There is a space 149 between the counter electrode unit 137 and the counter electrode unit 139. There is a space 151 between the counter electrode unit 141 and the counter electrode unit 143. The counter electrode units 137, 139, 141, 143 are connected to one polarity of a power supply 109. The counter electrode units 137, 139, 141, 143 have similar configurations. Herein, a description will be given of configurations of the counter electrode unit 137, 139 with reference to FIG. 5.

The counter electrode units 137, 139 each have a layer structure in which a conductive base material 153, an alkali metal-containing plate 155, and a porous insulating member 157 are layered. Examples of materials of the conductive base material 153 include copper, stainless steel, and nickel. The alkali metal-containing plate 155 is not limited to a specific form, and may be, for example, an alkali metal plate, and an alkali metal alloy plate. The thickness of the alkali metal-containing plate 155 is, for example, 0.03 to 6 mm.

The porous insulating member 157 has a plate shape. The porous insulating member 157 is stacked on the alkali metal-containing plate 155. The plate shape of the porous insulating member 157 is a shape in a state where the porous insulating member 157 is stacked on the alkali metal-containing plate 155. The porous insulating member 157 may be a member that maintains a certain shape by itself or may be a member that is easily deformable, such as a net.

The porous insulating member 157 is porous. Thus, a dope solution described later can pass through the porous insulating member 157. This allows the alkali metal-containing plate 155 to come into contact with the dope solution.

Examples of the porous insulating member 157 include a mesh made of a resin. Examples of the resin include polyethylene, polypropylene, nylon, polyetheretherketone, and polytetrafluoroethylene. A mesh opening of the mesh, which may be appropriately specified, may be, for example, 0.1 µm to 10 mm, and preferably within a range of 0.1 to 5 mm. The thickness of the mesh, which may be appropriately specified, may be, for example, 1 µm to 10 mm, and preferably within a range of 30 µm to 1 mm. A mesh opening ratio of the mesh, which may be appropriately specified, may be, for example, 5 to 98%, preferably within a range of 5 to 95%, more preferably within a range of 50 to 95%.

The porous insulating member 157 may be entirely made of an insulating material, or may partially comprise an insulating layer.

The downstream bath 133 has basically a configuration similar to that of the upstream bath 131. However, the conveyor roller 46 instead of the conveyor roller 40 is disposed inside the downstream bath 133. The counter electrode units 137, 139, 141, 143 provided in the downstream bath 133 are connected to one polarity of the power supply 110.

The doping bath 19 has basically a configuration similar to that of the doping bath 17. However, the conveyor rollers 52, 58 instead of the conveyor rollers 40, 46 are disposed inside the doping bath 19. The counter electrode units 137, 139, 141, 143 provided in the upstream bath 131 of the doping bath 19 are connected to one polarity of the power supply 111. The counter electrode units 137, 139, 141, 143 provided in the downstream bath 133 of the doping bath 19 are connected to one polarity of the power supply 112.

The doping bath 21 has basically a configuration similar to that of the doping bath 17. However, the conveyor rollers 64, 70 instead of the conveyor rollers 40, 46 are disposed inside the doping bath 21. The counter electrode units 137, 139, 141, 143 provided in the upstream bath 131 of the doping bath 21 are connected to one polarity of the power supply 113. The counter electrode units 137, 139, 141, 143 provided in the downstream bath 133 of the doping bath 21 are connected to one polarity of the power supply 114.

The cleaning bath 23 has basically a configuration similar to that of the electrolyte solution treatment bath 15. However, the conveyor roller 75 instead of the conveyor roller 33 is disposed inside the cleaning bath 23.

In the conveyor roller group, the conveyor rollers 37, 39, 43, 45, 49, 51, 55, 57, 61, 63, 67, 69 are made of an electrically conductive material. The remaining conveyor rollers in the conveyor roller group are each made of an elastomer except for bearing portions thereof. The conveyor roller group conveys the electrode 1 along a path running from the supply roll 101 to the winding roll 103 sequentially through the electrolyte solution treatment bath 15, the doping bath 17, the doping bath 19, the doping bath 21, the cleaning bath 23, and the tub cleaner 117.

A part of the path passing through the electrolyte solution treatment bath 15 is a path that first runs downward through the conveyor rollers 29, 31, and that is then directed upward by the conveyor roller 33.

A part of the above-described path passing through the doping bath 17 is as follows. The part of the path is first directed downward by the conveyor roller 37 and runs downward in the space 149 in the upstream bath 131. Then, the part of the path is directed upward by the conveyor roller 40 and runs upward in the space 151 in the upstream bath 131. Then, the part of the path is directed downward by the conveyor rollers 41, 43 and runs downward in the space 149 in the downstream bath 133, and is then directed upward by the conveyor roller 46 and runs upward in the space 151 in the downstream bath 133. Finally, the part of the path is directed into a horizontal direction by the conveyor roller 47 and runs toward the doping bath 19.

A part of the above-described path passing through the doping bath 19 is as follows. The part of the path is first directed downward by the conveyor roller 49 and runs downward in the space 149 in the upstream bath 131. Then, the part of the path is directed upward by the conveyor roller 52 and runs upward in the space 151 in the upstream bath 131. Then, the part of the path is directed downward by the conveyor rollers 53, 55 and runs downward in the space 149 in the downstream bath 133. Then, the part of the path is directed upward by the conveyor roller 58 and runs upward in the space 151 in the downstream bath 133. Finally, the part of the path is directed into the horizontal direction by the conveyor roller 59 and runs toward the doping bath 21.

A part of the above-described path passing through the doping bath 21 is as follows. The part of the path is first directed downward by the conveyor roller 61 and runs downward in the space 149 in the upstream bath 131. Then, the part of the path is directed upward by the conveyor roller 64 and runs upward in the space 151 in the upstream bath 131. Then, the part of the path is directed downward by the conveyor rollers 65, 67 and runs downward in the space 149 in the downstream bath 133. Then, the part of the path is directed upward by the conveyor roller 70 and runs upward in the space 151 in the downstream bath 133. Finally, the part of the path is directed into the horizontal direction by the conveyor roller 71 and runs toward the cleaning bath 23.

A part of the above-described path passing through the cleaning bath 23 is first directed downward by the conveyor roller 73 and runs downward, and then is directed upward by the conveyor roller 75.

The electrode 1 is wound around the supply roll 101. Specifically, the supply roll 101 holds the electrode 1 in a wound-up state. The active material of the electrode 1 held by the supply roll 101 is not yet doped with the alkali metal.

The conveyor roller group draws the electrode 1 held by the supply roll 101, and conveys the electrode 1. The winding roll 103 winds up and stores the electrode 1 conveyed by the conveyor roller group. The electrode 1 stored on the winding roll 103 has been pre-doped in the doping baths 17, 19, 21. Thus, the active material of the electrode 1 stored on the winding roll 103 is doped with the alkali metal.

The supports 105 support the electrolyte solution treatment bath 15, the doping baths 17, 19, 21, and the cleaning bath 23 from below. The supports 105 are changeable in height. The circulation filtration unit 107 is provided in each of the doping baths 17, 19, 21. The circulation filtration unit 107 comprises a filter 161, a pump 163, and a pipe 165.

In the circulation filtration unit 107 provided in the doping bath 17, the pipe 165 is a circulation pipe that extends from the doping bath 17, sequentially passes through the pump 163 and the filter 161, and then returns to the doping bath 17. The dope solution in the doping bath 17 is circulated through the pipe 165 and the filter 161 by a driving force of the pump 163, and is returned to the doping bath 17. Thus, foreign matters and the like in the dope solution are filtered by the filter 161. Examples of the foreign matters include foreign matters precipitated from the dope solution and foreign matters generated from the electrode 1. Examples of a material of the filter 161 include resin, such as polypropylene and polytetrafluoroethylene. A pore size of the filter 161, which may be appropriately specified, is 0.2 to 50 μm, for example.

The circulation filtration units 107 provided in the doping baths 19, 21 each also have a similar configuration and a similar operation effect. In FIG. 3 and FIG. 4, illustration of the dope solution is omitted for the purpose of convenience.

One terminal of the power supply 109 is connected to the conveyor rollers 37, 39. The other terminal of the power supply 109 is connected to the counter electrode units 137, 139, 141, 143 provided in the upstream bath 131 of the doping bath 17. The electrode 1 comes into contact with the conveyor rollers 37, 39. The electrode 1 and the counter electrode units 137, 139, 141, 143 are disposed in the dope solution that is an electrolyte solution. Thus, the electrode 1 and the counter electrode units 137, 139, 141, 143 are electrically connected to each other through the electrolyte solution in the upstream bath 131 of the doping bath 17.

One terminal of the power supply 110 is connected to the conveyor rollers 43, 45. The other terminal of the power supply 110 is connected to the counter electrode units 137, 139, 141, 143 provided in the downstream bath 133 of the doping bath 17. The electrode 1 comes into contact with the conveyor rollers 43, 45. The electrode 1 and the counter electrode units 137, 139, 141, 143 are disposed in the dope solution that is the electrolyte solution. Thus, the electrode 1 and the counter electrode units 137, 139, 141, 143 are electrically connected to each other through the electrolyte solution in the downstream bath 133 of the doping bath 17.

One terminal of the power supply 111 is connected to the conveyor rollers 49, 51. The other terminal of the power supply 111 is connected to the counter electrode units 137, 139, 141, 143 provided in the upstream bath 131 of the doping bath 19. The electrode 1 comes into contact with the conveyor rollers 49, 51. The electrode 1 and the counter electrode units 137, 139, 141, 143 are disposed in the dope solution that is the electrolyte solution. Thus, the electrode 1 and the counter electrode units 137, 139, 141, 143 are electrically connected to each other through the electrolyte solution in the upstream bath 131 of the doping bath 19.

One terminal of the power supply 112 is connected to the conveyor rollers 55, 57. The other terminal of the power supply 112 is connected to the counter electrode units 137, 139, 141, 143 provided in the downstream bath 133 of the doping bath 19. The electrode 1 comes into contact with the conveyor rollers 55, 57. The electrode 1 and the counter electrode units 137, 139, 141, 143 are disposed in the dope solution that is the electrolyte solution. Thus, the electrode 1 and the counter electrode units 137, 139, 141, 143 are electrically connected to each other through the electrolyte solution in the downstream bath 133 of the doping bath 19.

One terminal of the power supply 113 is connected to the conveyor rollers 61, 63. The other terminal of the power supply 113 is connected to the counter electrode units 137, 139, 141, 143 provided in the upstream bath 131 of the doping bath 21. The electrode 1 comes into contact with the conveyor rollers 61, 63. The electrode 1 and the counter electrode units 137, 139, 141, 143 are disposed in the dope solution that is the electrolyte solution. Thus, the electrode 1 and the counter electrode units 137, 139, 141, 143 are electrically connected to each other through the electrolyte solution in the upstream bath 131 of the doping bath 21.

One terminal of the power supply 114 is connected to the conveyor rollers 67, 69. The other terminal of the power supply 114 is connected to the counter electrode units 137, 139, 141, 143 provided in the downstream bath 133 of the doping bath 21. The electrode 1 comes into contact with the conveyor rollers 67, 69. The electrode 1 and the counter electrode units 137, 139, 141, 143 are disposed in the dope solution that is the electrolyte solution. Thus, the electrode 1 and the counter electrode units 137, 139, 141, 143 are electrically connected to each other through the electrolyte solution in the downstream bath 133 of the doping bath 21.

The tub cleaner 117 cleans end portions of the electrode 1 in a width direction W of the electrode 1. The recovery unit 119 is arranged in each of the electrolyte solution treatment bath 15, the doping baths 17, 19, 21, and the cleaning bath 23. The recovery unit 119 collects the solution carried away from the bath by the electrode 1, and then returns the collected solution to the bath. A configuration of the recovery unit 119 will be described in detail below. Of the recovery units 119, the one arranged in the electrolyte solution treatment bath 15 corresponds to a recovery unit for an electrolyte solution treatment bath. Of the recovery units 119, the one arranged in the cleaning bath 23 corresponds to a recovery unit for a cleaning bath.

The end portion sensors 121 detect positions of the end portions of the electrode 1 in the width direction W. An end position adjusting unit, which is not shown, adjusts positions of the supply roll 101 and the winding roll 103 in the width direction W, based on detection results provided by the end portion sensors 121. The end position adjusting unit adjusts the positions of the supply roll 101 and the winding roll 103 in the width direction W, such that the ends of the electrode 1 in the width direction W thereof are positioned so as to be cleaned by the tub cleaner 117.

3. Configuration of Recovery Unit 119

A configuration of the recovery unit 119 will be described with reference to FIG. 6 and FIG. 7. The recovery unit 119 comprises a fixed portion 171 and a rotating portion 173. The fixed portion 171 is fixed to a wall or the like (not shown).

The fixed portion 171 comprises a support plate 175, a removal roll 177, a transfer roll 179, a liquid discharging roll 181, a scraper 183, and a droplet guide 185. The removal roll 177 and a removal roll 191, which is be described below, correspond to recovery rolls. The scraper 183 and a scraper 197, which is described below, correspond to cleaning units.

The support plate 175 comprises a plate-shaped member. The removal roll 177 is rotatably attached to the support plate 175. An axial direction of the removal roll 177 is horizontal and parallel to the width direction W of the electrode 1 conveyed by the conveyor roller group. Preferably, the removal roll 177 except for its shaft portion at the center is formed of an elastic material. More preferably, the removal roll 177 is formed of a porous material.

Examples of the elastic material include ethylene propylene diene rubber, polyvinyl alcohol rubber, polyurethane rubber, polyolefinic rubber, fluororubber, silicon rubber sponge, nitrile-butadiene rubber, hydrogenated acrylonitrile-butadiene rubber, isoprene rubber, butyl rubber, butadiene rubber, styrene-butadiene rubber, chloroprene rubber, chlorosulfonated polyethylene rubber, acrylic rubber, and epichlorohydrin rubber.

The transfer roll 179 is rotatably attached to the support plate 175. An axial direction of the transfer roll 179 is parallel to the axial direction of the removal roll 177. An outer circumferential surface of the transfer roll 179 is in contact with an outer circumferential surface of the removal roll 177. The transfer roll 179 except for its shaft portion at the center is formed of an elastic porous material. Examples of the material for forming the transfer roll 179 include porous materials such as ethylene propylene diene rubber, polyvinyl alcohol rubber, polyurethane rubber, polyolefinic rubber, fluororubber, silicon rubber sponge, nitrile-butadiene rubber, hydrogenated acrylonitrile-butadiene rubber, isoprene rubber, butyl rubber, butadiene rubber, styrene-butadiene rubber, chloroprene rubber, chlorosulfonated polyethylene rubber, acrylic rubber, and epichlorohydrin rubber.

The liquid discharging roll 181 is rotatably attached to the support plate 175. An axial direction of the liquid discharging roll 181 is parallel to the axial direction of the removal roll 177. The liquid discharging roll 181 is formed of a harder material than that of the transfer roll 179. An outer circumferential surface of the liquid discharging roll 181 presses against an outer circumferential surface of the transfer roll 179. As a result, a portion of the transfer roll 179 around a part thereof in contact with the liquid discharging roll 181 is compressed and reduced in volume.

A tip end 183A of the scraper 183 is in contact with the outer circumferential surface of the removal roll 177. The droplet guide 185 comprises a plate-shaped member. The droplet guide 185 is attached to the support plate 175. The droplet guide 185 is located below the removal roll 177, the transfer roll 179, the liquid discharging roll 181, and the scraper 183. The droplet guide 185 is further tilted downward as it is closer to the center of the recovery unit 119 in a width direction of the recovery unit 119.

The rotating portion 173 is attached to the fixed portion 171 so as to be rotatable around a rotational shaft 187. The rotating portion 173 comprises a support plate 189, the removal roll 191, a transfer roll 193, a liquid discharging roll 195, a scraper 197, and a droplet guide 199.

The support plate 189 comprises a plate-shaped member. The support plate 189 comprises a rectangular main body portion 189A and a lever portion 189B. The lever portion 189B transversally protrudes from a vicinity of an upper end of the main body portion 189A.

The removal roll 191 is rotatably attached to the main body portion 189A. An axial direction of the removal roll 191 is parallel to the axial direction of the removal roll 177. Preferably, the removal roll 191 except for its shaft portion at the center is formed of an elastic material. More preferably, the removal roll 191 is formed of a porous material. The material for forming the removal roll 191 is the same as, for example, the material for forming the removal roll 177.

The transfer roll 193 is rotatably attached to the main body portion 189A. An axial direction of the transfer roll 193 is parallel to the axial direction of the removal roll 177. An outer circumferential surface of the transfer roll 193 is in contact with an outer circumferential surface of the removal roll 191. The transfer roll 193 except for its shaft portion at the center is formed of an elastic porous material. The material for forming the transfer roll 193 is the same as, for example, the material for forming the transfer roll 179.

The liquid discharging roll 195 is rotatably attached to the main body portion 189A. An axial direction of the liquid discharging roll 195 is parallel to the axial direction of the removal roll 177. The liquid discharging roll 195 is formed of a harder material than that of the transfer roll 193. An outer circumferential surface of the liquid discharging roll 195 presses against an outer circumferential surface of the transfer roll 193. As a result, a portion of the transfer roll 193 around a part thereof in contact with the liquid discharging roll 195 is compressed and reduced in volume.

A tip end 197A of the scraper 197 is in contact with the outer circumferential surface of the removal roll 191. The droplet guide 199 comprises a plate-shaped member. The droplet guide 199 is attached to the main body portion 189A. The droplet guide 199 is located below the removal roll 191, the transfer roll 193, the liquid discharging roll 195, and the scraper 197. The droplet guide 199 is further tilted downward as it is closer to the center of the recovery unit 119 in the width direction of the recovery unit 119.

A weight 201 is attached to a tip end of the lever portion 189B. The rotating portion 173 is biased by means of the weight 201 so as to rotate in an X-direction shown in FIG. 6 and FIG. 7.

If the rotating portion 173 is rotated in the X-direction, the recovery unit 119 is brought into a state shown in FIG. 6 (hereinafter referred to as a "first state"). In the first state, the removal roll 177 and the removal roll 191 hold the electrode 1 from both sides. The removal roll 177 and the removal roll 191 pressurize the electrode 1 at pressure of between 0.1 g/cm$^2$ and 100 kg/cm$^2$. The removal roll 177 and the removal roll 191 pressurize the electrode 1 at pressure, preferably of between 1 g/cm$^2$ and 5 kg/cm$^2$, and more preferably of between 5 g/cm$^2$ and 500 g/cm$^2$. When the active material contained in the active material layer 5 is doped with the alkali metal, the recovery unit 119 is brought into the first state.

If the rotating portion 173 is rotated in a Y direction shown in FIG. 6 and FIG. 7, the recovery unit 119 is brought into a state shown in FIG. 7 (hereinafter referred to as a "second state"). In the second state, the removal roll 191 is distanced away from the removal roll 177. In the second state, the removal roll 177 and the removal roll 191 do not pressurize the electrode 1. When the electrode 1 is fed, the recovery unit 119 is brought into the second state.

4. Composition of Dope Solution

In use of the doping system 11, the dope solution is stored in the electrolyte solution treatment bath 15 and the doping baths 17, 19, 21. The dope solution contains alkali metal ions and a solvent. The dope solution is an electrolyte solution.

Examples of the solvent include an organic solvent. The organic solvent is preferably an aprotic organic solvent. Examples of the aprotic organic solvent include ethylene carbonate, propylene carbonate, butylene carbonate, dimethyl carbonate, diethyl carbonate, methyl ethyl carbonate, 1-fluoroethylene carbonate, γ-butyrolactone, acetonitrile, dimethoxyethane, tetrahydrofuran, dioxolane, methylene chloride, sulfolane, diethylene glycol dimethyl ether (diglyme), diethylene glycol methyl ethyl ether, triethylene glycol dimethyl ether (triglyme), triethylene glycol butyl methyl ether, and tetraethylene glycol dimethyl ether (tetraglyme).

Also, as the organic solvent, ionic liquids of a quaternary imidazolium salt, quaternary pyridinium salt, quaternary pyrrolidinium salt, quaternary piperidinium salt, and the like, may be used. The organic solvent may be made of a single component, or may be a mixed solvent of two or more types of components. The organic solvent may be made of a single component, or may be a mixed solvent of two or more types of components.

The alkali metal ions included in the dope solution are ions forming an alkali metal salt. The alkali metal salt is preferably a lithium salt or a sodium salt. Examples of an anionic moiety forming the alkali metal salt include phosphorus anion having a fluoro group, such as $PF_6^-$, $PF_3(C_2F_5)_3^-$, and $PF_3(CF_3)_3^-$; boron anion having a fluoro group or a cyano group, such as $BF_4^-$, $BF_2(CF)_2^-$, $BF_3(CF_3)^-$, and $B(CN)_4^-$; sulfonyl imide anion having a fluoro group, such as $N(FSO_2)_2^-$, $N(CF_3SO_2)_2^-$, and $N(C_2F_5SO_2)_2^-$; and organic sulfonic acid anion having a fluoro group, such as $CF_3SO_3^-$.

A concentration of the alkali metal salt in the dope solution is preferably 0.1 mol/L or more, and more preferably within a range of 0.5 to 1.5 mol/L. Within this range of the concentration of the alkali metal salt, pre-doping of the alkali metal proceeds efficiently.

The dope solution may further comprise additives, such as vinylene carbonate, vinylethylene carbonate, 1-fluoroethylene carbonate, 1-(trifluoromethyl) ethylene carbonate, succinic anhydride, maleic anhydride, propane sultone, and diethyl sulfone.

The dope solution may further comprise a flame retardant, such as a phosphazene compound. From the viewpoint of effective control of a thermal runaway reaction while doping the alkali metal, an added amount of the flame retardant is preferably 1 part by mass or more, and more preferably 3 parts by mass or more, and yet more preferably 5 parts by mass or more, with respect to 100 parts by mass of the dope solution. From the viewpoint of obtaining a high-quality doped electrode, the added amount of the flame retardant is preferably 20 parts by mass or less, and more preferably 15 parts by mass or less, and yet more preferably 10 parts by mass or less, with respect to 100 parts by mass of the dope solution.

5. Method of Using Doping System 11

First, the following is performed for preparation of doping the electrode 1. The electrode 1 is wound around the supply roll 101. Subsequently, the electrode 1 is drawn out from the supply roll 101, and is fed to the winding roll 103 along the above-described path. At this time, the recovery unit 119 is set in the second state. Then, the electrolyte solution treatment bath 15, the doping baths 17, 19, 21, and the cleaning bath 23 are raised and set at specified positions shown in FIG. 3.

The dope solution is stored in the electrolyte solution treatment bath 15 and the doping baths 17, 19, 21. The dope solution is as described in "4. Composition of Dope Solution". The cleaning liquid is stored in the cleaning bath 23. The cleaning liquid is an organic solvent. The recovery unit 119 is brought into the first state.

Next, the conveyor roller group conveys the electrode 1 from the supply roll 101 to the winding roll 103 along the above-described path. While the electrode 1 passes through the doping baths 17, 19, 21, the active material contained in the active material layer 5 is pre-doped with the alkali metal.

The electrode 1 is cleaned in the cleaning bath 23 while being conveyed by the conveyor roller group. Next, the electrode 1 is wound up by the winding roll 103. The electrode 1 may be a positive electrode or a negative electrode. When the positive electrode is produced, a positive electrode active material is doped with the alkali metal using the doping system 11. When a negative electrode is produced, a negative electrode active material is doped with the alkali metal using the doping system 11.

When lithium is occluded in a negative electrode active material of a lithium ion capacitor, a doping amount of the alkali metal is preferably 70 to 95% with respect to a theoretical capacity of the negative electrode active material. When lithium is occluded in a negative electrode active material of a lithium-ion rechargeable battery, the doping amount is preferably 10 to 30% with respect to the theoretical capacity of the negative electrode active material.

6. Effects Achieved by Doping System 11

(1A) The doping system 11 comprises two or more recovery units 119. The recovery units 119 are arranged in the electrolyte solution treatment bath 15, the doping baths 17, 19, 21, and the cleaning bath 23 respectively. The recovery units 119 arranged in the doping baths 17, 19, 21 reduce the amount of the dope solution carried away from the doping baths 17, 19, 21 by the electrode 1. A description will be given of effects of the recovery units 119 arranged in the doping baths 17, 19, 21.

Figure 6:
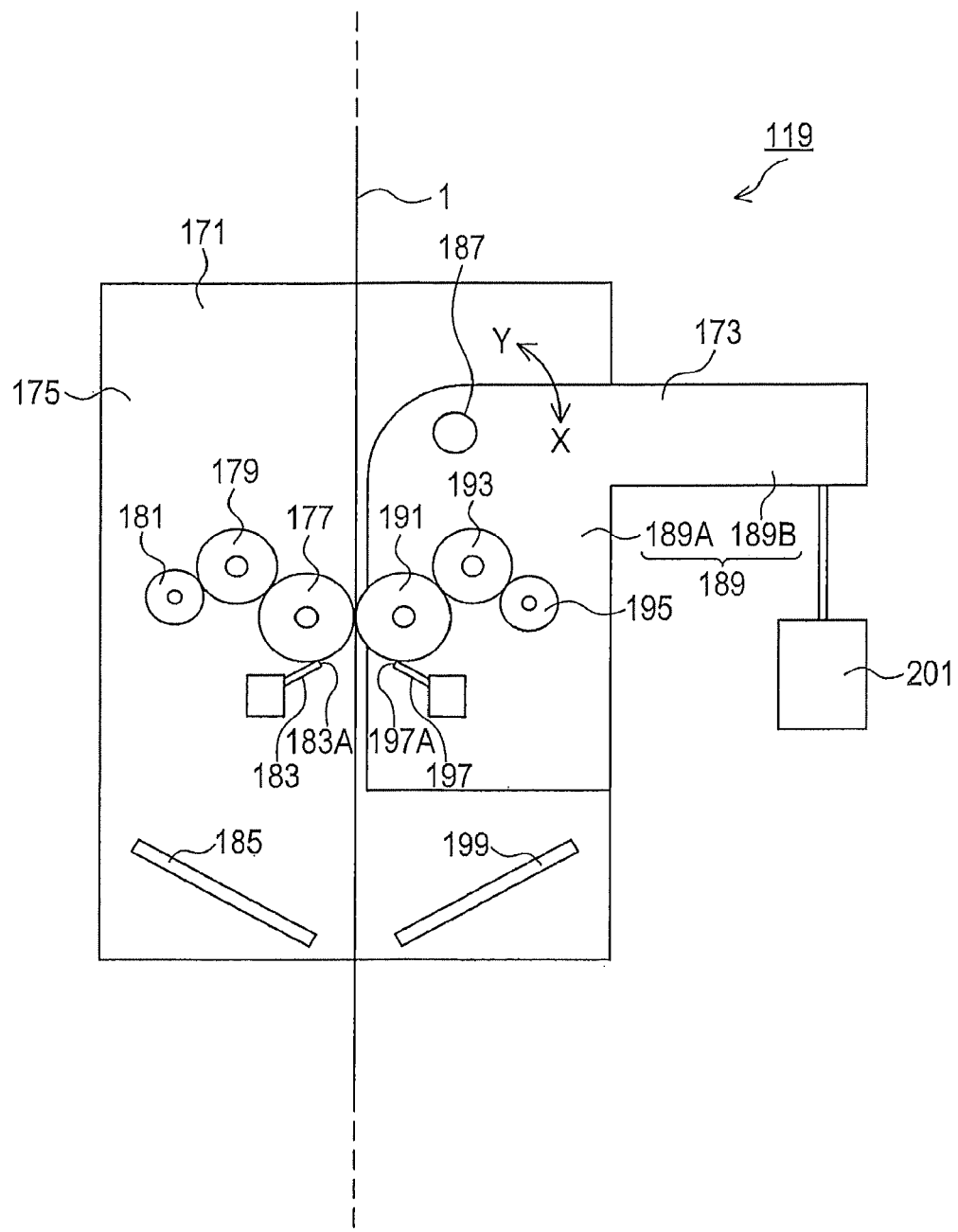
FIG. 6 is an explanatory view showing a configuration of a recovery unit in a first state.
Figure 7:
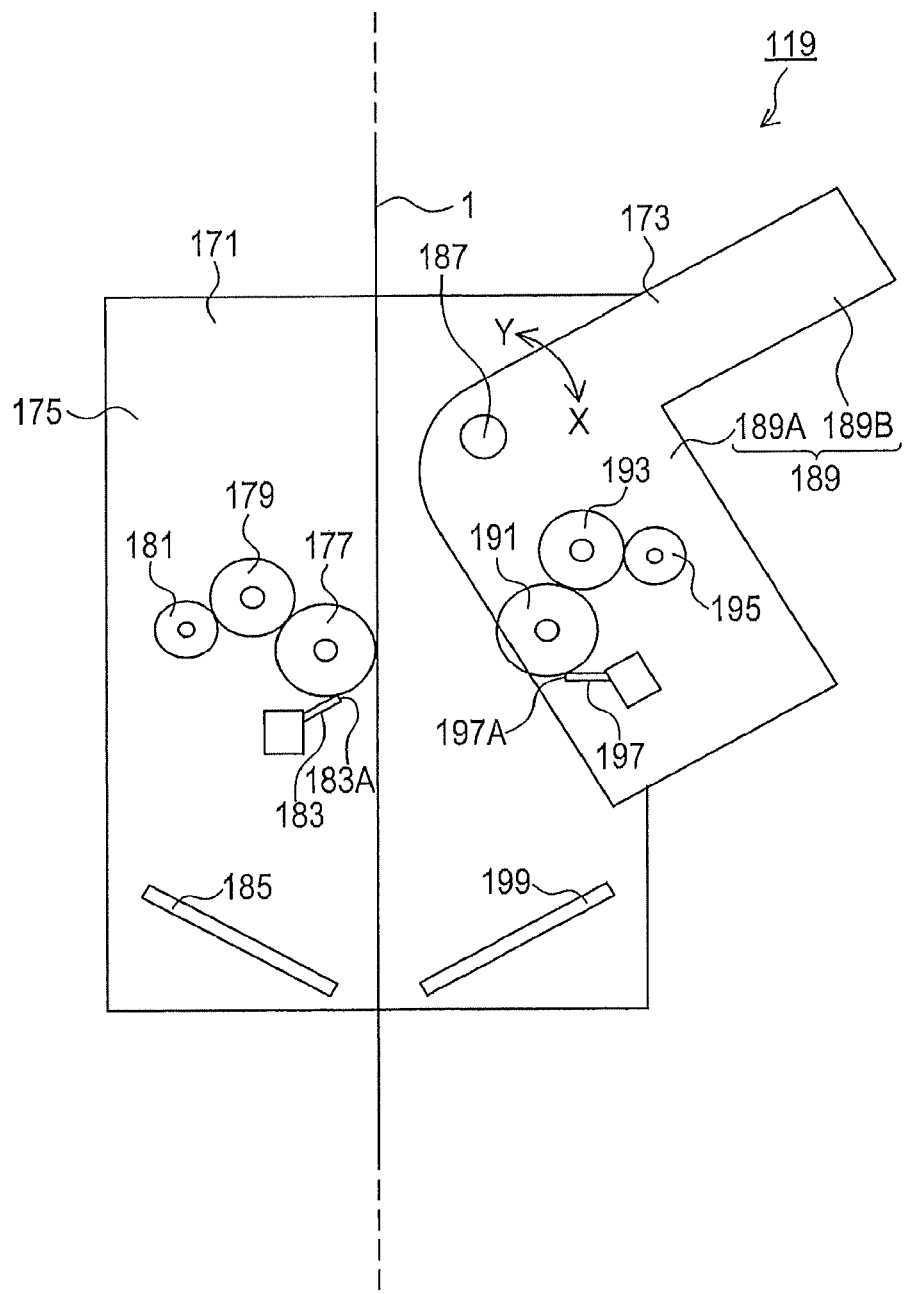
FIG. 7 is an explanatory view showing a configuration of the recovery unit in a second state.

The electrode 1 having passed through the doping baths 17, 19, 21 proceeds upward, and enters the recovery unit 119, as shown in FIG. 6. The dope solution adheres to surfaces of the electrode 1. The removal rolls 177, 191 hold the electrode 1 from both sides. The dope solution adhered to the electrode 1 is absorbed by the removal rolls 177, 191.

The transfer roll 179 absorbs the dope solution contained in the removal roll 177. Thus, the removal roll 177 can further absorb the dope solution adhered to the electrode 1.

The transfer roll 193 absorbs the dope solution contained in the removal roll 191. Thus, the removal roll 191 can further absorb the dope solution adhered to the electrode 1.

The liquid discharging roll 181 compresses the transfer roll 179. Accordingly, the dope solution contained in the transfer roll 179 is discharged from the transfer roll 179, and drops. The dropped dope solution is guided by the droplet guide 185, and returned to the doping baths 17, 19, 21. The transfer roll 179 discharges the dope solution, and thus can further absorb the dope solution contained in the removal roll 177.

The liquid discharging roll 195 compresses the transfer roll 193. Accordingly, the dope solution contained in the transfer roll 193 is discharged from the transfer roll 193, and drops. The dropped dope solution is guided by the droplet guide 199, and returned to the doping baths 17, 19, 21. The transfer roll 193 discharges the dope solution, and thus can further absorb the dope solution contained in the removal roll 191.

Thus, the recovery units 119 collect the dope solution adhered to the electrode 1, and return it to the doping baths 17, 19, 21. As a result, the recovery units 119 reduce the amount of the dope solution carried away from the doping baths 17, 19, 21 by the electrode 1.

Similarly, the recovery unit 119 arranged in the electrolyte solution treatment bath 15 collects the dope solution adhered to the electrode 1, and returns it to the electrolyte solution treatment bath 15. Thus, the recovery unit 119 reduces an amount of the dope solution carried away from the electrolyte solution treatment bath 15 by the electrode 1.

Similarly, the recovery unit 119 arranged in the cleaning bath 23 collects the cleaning liquid adhered to the electrode 1, and returns it to the cleaning bath 23. As the result, the recovery unit 119 reduces an amount of the cleaning liquid carried away from the cleaning bath 23 by the electrode 1.

(1B) The recovery unit 119 collects the liquid by using the removal rolls 177, 191. This enables the recovery units 119 to collect the liquid quite efficiently. The liquid means the dope solution or the cleaning liquid.

(1C) The pressure at which the removal rolls 177, 191 pressurize the electrode 1 ranges from 0.1 g/cm$^2$ to 100 kg/cm$^2$. As the pressure for pressurizing the electrode 1 is 0.1 g/cm$^2$ or more, the recovery unit 119 can collect the liquid quite efficiently. As the pressure for pressurizing the electrode 1 is 100 kg/cm$^2$ or less, the recovery unit 119 can reduce damage to the electrode 1.

(1D) The removal rolls 177, 191 are formed of the elastic material. This achieves close contact of the removal rolls 177, 191 with the electrode 1. Accordingly, the recovery unit 119 can collect the liquid quite efficiently.

(1E) The removal rolls 177, 191 are preferably formed of the porous material. If the removal rolls 177, 191 are formed of the porous material, the removal rolls 177, 191 can collect the liquid adhered to the electrode 1 quite easily. Accordingly, the recovery unit 119 can collect the liquid quite efficiently.

(1F) The recovery unit 119 comprises the scrapers 183, 197. The scraper 183 can clean the outer circumferential surface of the removal roll 177. The scraper 197 can clean the outer circumferential surface of the removal roll 191.

The recovery unit 119 includes the scrapers 183, 197, and thus can inhibit dirt or the like on the outer circumferential surfaces of the removal rolls 177, 191 from adhering to the surface of the electrode 1.

Second Embodiment

1. Difference from First Embodiment

Since a second embodiment has a basic configuration similar to that of the first embodiment, differences therebetween will be described below. It is to be noted that the same reference numerals as those in the first embodiment indicate the same configurations, and reference is made to the preceding description.

In the above-described first embodiment, the recovery unit 119 includes the transfer rolls 179, 193 and the liquid discharging rolls 181, 195. Differently from the first embodiment, the recovery unit 119 according to the second embodiment does not include the transfer rolls 179, 193 and the liquid discharging rolls 181, 195.

2. Effects Achieved by Doping System 11

According to the second embodiment detailed above, the above-described effects (1B) to (1F) of the first embodiment as well as the following effects are achieved.

(2A) The doping system 11 comprises two or more recovery units 119. The recovery units 119 are arranged in the electrolyte solution treatment bath 15, the doping baths 17, 19, 21, and the cleaning bath 23 respectively. The recovery units 119 arranged in the doping baths 17, 19, 21 reduce the amount of the dope solution carried away from the doping baths 17, 19, 21 by the electrode 1. A description will be given of effects of the recovery units 119 arranged in the doping baths 17, 19, 21.

Figure 8:
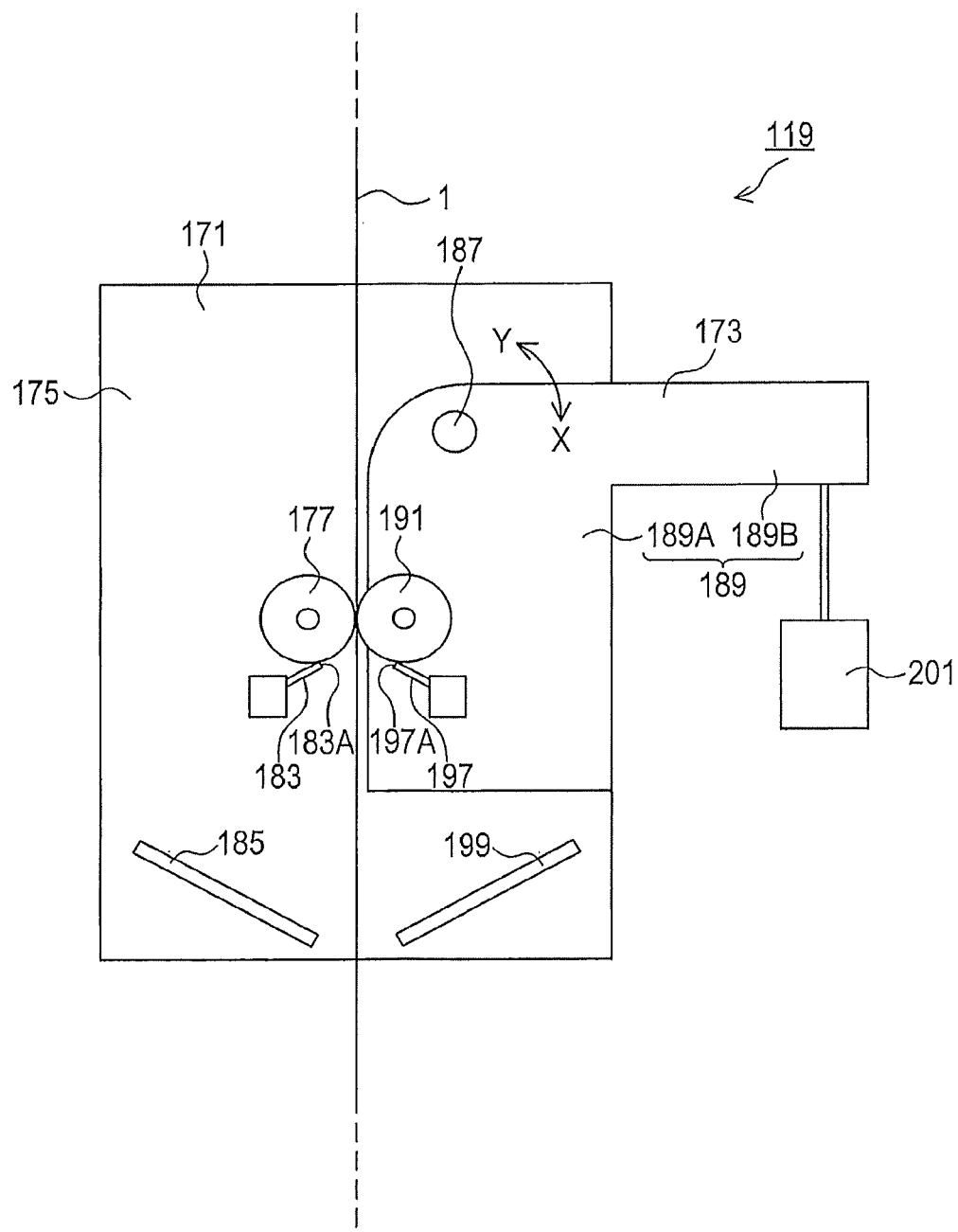
FIG. 8 is an explanatory view showing a configuration of a recovery unit according to a second embodiment.

The electrode 1 having passed through the doping baths 17, 19, 21 proceeds upward, and enters the recovery unit 119, as shown in FIG. 8. The dope solution adheres to surfaces of the electrode 1. The removal rolls 177, 191 hold the electrode 1 from both sides. The dope solution adhered to the electrode 1 is absorbed by the removal rolls 177, 191.

As the amount of the dope solution contained in the removal rolls 177, 191 becomes larger, the dope solution drops from the removal rolls 177, 191. The dropped dope solution is guided by the droplet guides 185, 199, and returns to the doping baths 17, 19, 21.

Thus, the recovery units 119 collect the dope solution adhered to the electrode 1, and return it to the doping baths 17, 19, 21. Thus, the recovery units 119 reduce the amount of the dope solution carried away from the doping baths 17, 19, 21 by the electrode 1.

Similarly, the recovery unit 119 arranged in the electrolyte solution treatment bath 15 collects the dope solution adhered to the electrode 1, and returns it to the electrolyte solution treatment bath 15. As a result, the recovery unit 119 reduces an amount of the dope solution carried away from the electrolyte solution treatment bath 15 by the electrode 1.

Similarly, the recovery unit 119 arranged in the cleaning bath 23 collects the cleaning liquid adhered to the electrode 1, and returns it to the cleaning bath 23. Thus, the recovery unit 119 reduces an amount of the cleaning liquid carried away from the cleaning bath 23 by the electrode 1.

Third Embodiment

1. Difference from First Embodiment

Since a third embodiment has a basic configuration similar to that of the first embodiment, differences therebetween will be described below. It is to be noted that the same reference numerals as those in the first embodiment indicate the same configurations, and reference is made to the preceding description.

Figure 9:
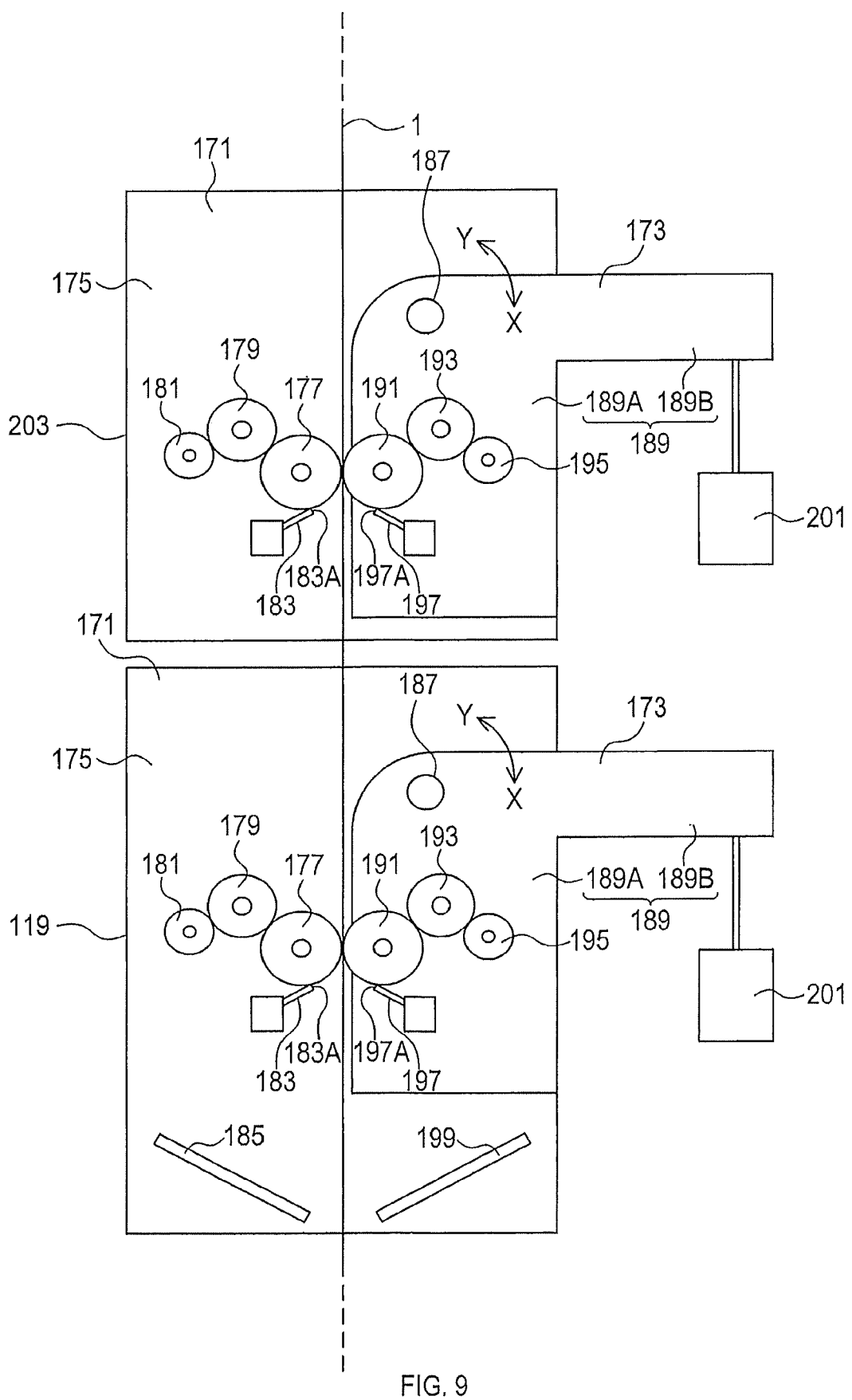
FIG. 9 is an explanatory view showing a configuration of a recovery unit according to a third embodiment.

As shown in FIG. 9, in addition to the recovery unit 119, the doping system 11 according to the third embodiment comprises a recovery unit 203. The recovery unit 203 is arranged above the recovery unit 119.

The recovery unit 203 has basically a configuration similar to that of the recovery unit 119. However, the recovery unit 203 does not include the droplet guide 185 and the droplet guide 199. The recovery unit 203 has a function similar to that of the recovery unit 119.

The removal roll 177 provided in the recovery unit 203 and the removal roll 177 provided in the recovery unit 119 are aligned along a longitudinal direction of the electrode 1. Further, the removal roll 191 provided in the recovery unit 203 and the removal roll 191 provided in the recovery unit 119 are also aligned along the longitudinal direction of the electrode 1.

2. Effects Achieved by Doping System 11

According to the third embodiment detailed above, the above-described effects of the first embodiment as well as the following effects are achieved.

(3A) In addition to the recovery unit 119, the doping system 11 comprises the recovery unit 203. This enables the doping system 11 to further reduce the amount of the liquid carried away from the doping baths 17, 19, 21, the electrolyte solution treatment bath 15, and the cleaning bath 23 by the electrode 1.

Fourth Embodiment

1. Difference from First Embodiment

Since a fourth embodiment has a basic configuration similar to that of the first embodiment, differences therebetween will be described below. It is to be noted that the same reference numerals as those in the first embodiment indicate the same configurations, and reference is made to the preceding description.

Figure 10:
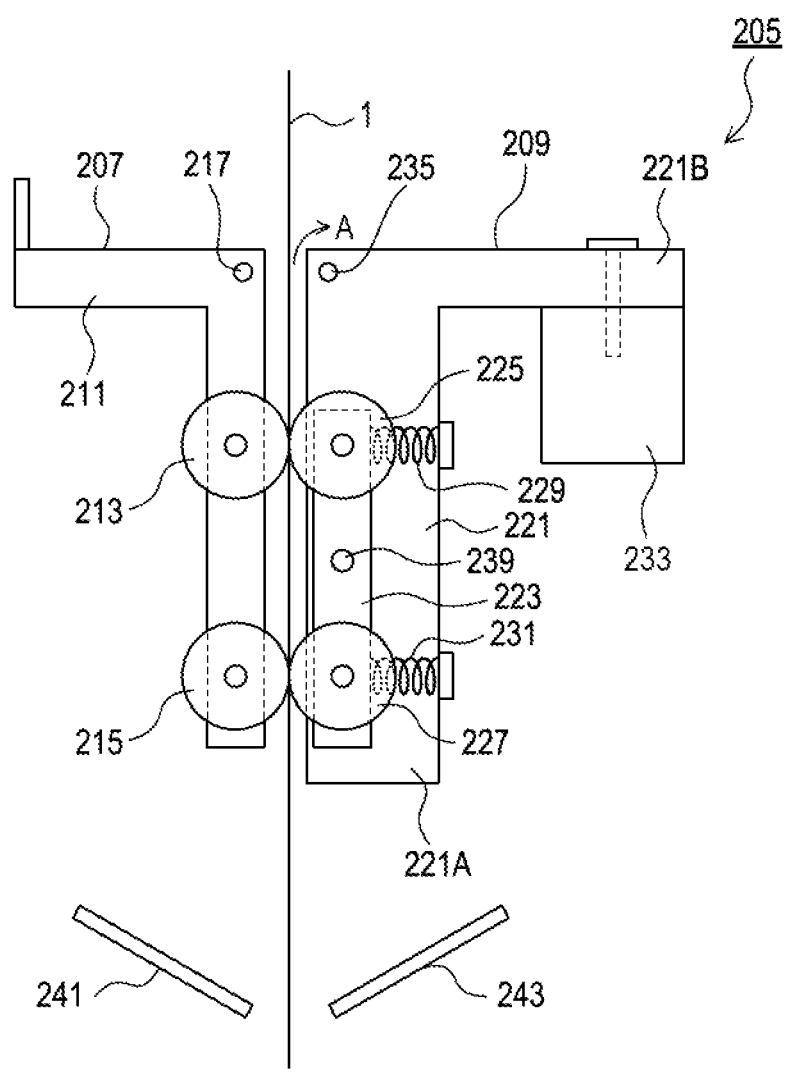
FIG. 10 is an explanatory view showing a configuration of a recovery unit according to a fourth embodiment.

The doping system 11 according to the fourth embodiment comprises a recovery unit 205 shown in FIG. 10, instead of the recovery unit 119.

The recovery unit 205 comprises a first portion 207 and a second portion 209. The first portion 207 and the second portion 209 are arranged so as to hold the electrode 1 therebetween. The first portion 207 comprises a support plate 211 and two removal rolls 213, 215. The removal rolls 213, 215 correspond to recovery rolls.

The support plate 211 comprises a plate-shaped member. The support plate 211 is L-shaped. The support plate 211 is attached to a wall or the like (not shown), so as to be rotatable around a rotational shaft 217. An axial direction of the rotational shaft 217 is horizontal and parallel to the width direction W of the electrode 1 conveyed by the conveyor roller group.

The removal rolls 213, 215 are rotatably attached to the support plate 211. The removal rolls 213, 215 are located below the rotational shaft 217. The removal roll 215 is located below the removal roll 213. In a first state, the removal rolls 213, 215 are in contact with the electrode 1. In the first state, the removal rolls 213, 215 are aligned along the longitudinal direction of the electrode 1. Axial directions of the removal rolls 213, 215 are horizontal and parallel to the width direction W of the electrode 1 conveyed by the conveyor roller group. The removal rolls 213, 215 have the same configuration as that of the removal roll 177 according to the first embodiment.

The second portion 209 comprises a support plate 221, a support plate 223, removal rolls 225, 227, and a weight 233. The support plate 221 comprises a plate-shaped member. The support plate 221 is L-shaped. The support plate 221 comprises a main body portion 221A extending vertically and a lever portion 221B extending transversally. The removal rolls 225, 227 correspond to recovery rolls.

The support plate 221 is attached to a wall or the like (not shown), so as to be rotatable around a rotational shaft 235. The rotational shaft 235 is located in a vicinity of an upper end of the main body portion 221A. An axial direction of the rotational shaft 235 is horizontal and parallel to the width direction W of the electrode 1 conveyed by the conveyor roller group.

The weight 233 is attached to the lever portion 221B. The support plate 211 is biased by means of the weight 233 so as to rotate in an A-direction. The A-direction is a direction in which the removal rolls 225, 227 come closer to the electrode 1. The support plate 223 comprises a plate-shaped member extending vertically. The support plate 223 is attached to the support plate 221 so as to be rotatable around a rotational shaft 239. An axial direction of the rotational shaft 239 is horizontal and parallel to the width direction W of the electrode 1 conveyed by the conveyor roller group.

The removal rolls 225, 227 are rotatably attached to the support plate 223. The removal rolls 225, 227 are located below the rotational shaft 235. The removal roll 227 is located below the removal roll 225. In the first state, the removal rolls 225, 227 are in contact with the electrode 1. In the first state, the removal rolls 225, 227 are aligned along the longitudinal direction of the electrode 1. Axial directions of the removal rolls 225, 227 are horizontal and parallel to the width direction W of the electrode 1 conveyed by the conveyor roller group. The removal rolls 225, 227 have configurations similar to that of the removal roll 191 according to the first embodiment.

One end of a spring 229 is fixed to the support plate 221. The opposite end of the spring 229 is in contact with a part of the support plate 223 that supports the removal roll 225. The spring 229 biases the removal roll 225 toward the electrode 1. One end of a spring 231 is fixed to the support plate 221. The opposite end of the spring 231 is in contact with a part of the support plate 223 that supports the removal roll 227. The spring 231 biases the removal roll 227 toward the electrode 1.

The droplet guide 241 is arranged below the first portion 207. The droplet guide 241 returns a liquid dripping from the first portion 207 back to each of the doping baths 17, 19, 21. A droplet guide 243 is arranged below the second portion 209. The droplet guide 243 returns a liquid dripping from the second portion 209 back to each of the doping baths 17, 19, 21.

2. Effects Achieved by Doping System 11

According to the fourth embodiment detailed above, the above-described effects of the first embodiment as well as the following effects are achieved.

(4A) The doping system 11 comprises the removal rolls 213, 215 aligned along the longitudinal direction of the electrode 1. Further, the doping system 11 comprises the removal rolls 225, 227 aligned along the longitudinal direction of the electrode 1. This enables the doping system 11 to further reduce the amount of the liquid carried away from the doping baths 17, 19, 21, the electrolyte solution treatment bath 15, and the cleaning bath 23 by the electrode 1.

(4B) The removal rolls 225, 227 are rotatable about the rotational shaft 239 with respect to the support plate 221. Thus, the doping system 11 can easily adjust a pressure at the time when the removal rolls 225, 227 contact the electrode 1.

Fifth Embodiment

1. Difference from First Embodiment

Since a fifth embodiment has a basic configuration similar to that of the first embodiment, differences therebetween will be described below. It is to be noted that the same reference numerals as those in the first embodiment indicate the same configurations, and reference is made to the preceding description.

Figure 11:
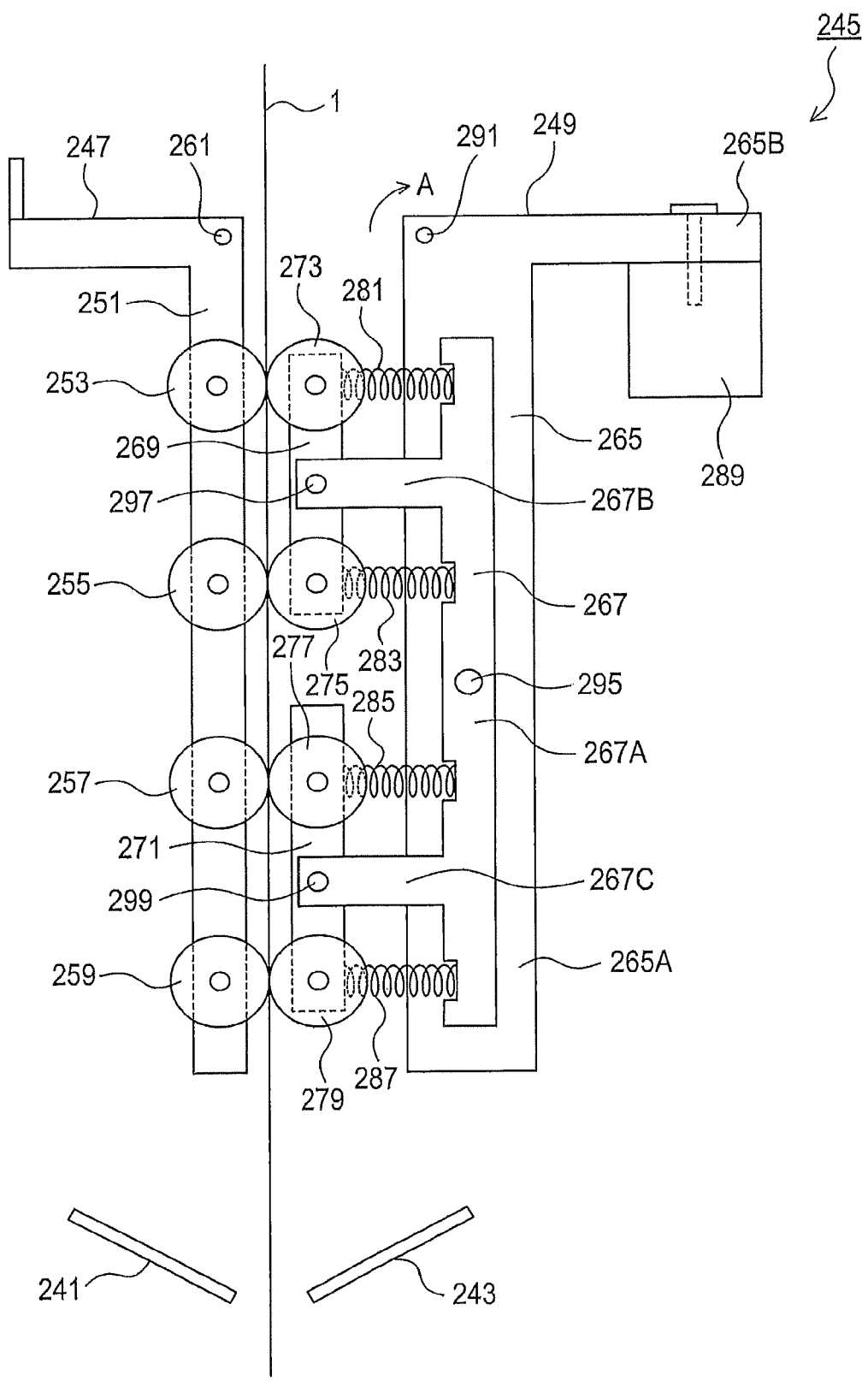
FIG. 11 is an explanatory view showing a configuration of a recovery unit according to a fifth embodiment.

The doping system 11 according to the fifth embodiment comprises a recovery unit 245 shown in FIG. 11, instead of the recovery unit 119.

The recovery unit 245 comprises a first portion 247 and a second portion 249. The first portion 247 and the second portion 249 are arranges so as to hold the electrode 1 therebetween. The first portion 247 comprises a support plate 251 and four removal rolls 253, 255, 257, 259. The removal rolls 253, 255, 257, 259 correspond to recovery rolls.

The support plate 251 comprises a plate-shaped member. The support plate 251 is L-shaped. The support plate 251 is attached to a wall or the like (not shown), so as to be rotatable around a rotational shaft 261. An axial direction of the rotational shaft 261 is horizontal and parallel to the width direction W of the electrode 1 conveyed by the conveyor roller group.

The removal rolls 253, 255, 257, 259 are rotatably attached to the support plate 251. The removal rolls 253, 255, 257, 259 are located below the rotational shaft 261. In a first state, the removal rolls 253, 255, 257, 259 are in contact with the electrode 1. In the first state, the removal rolls 253, 255, 257, 259 are aligned along the longitudinal direction of the electrode 1. Axial directions of the removal rolls 253, 255, 257, 259 are horizontal and parallel to the width direction W of the electrode 1 conveyed by the conveyor roller group. The removal rolls 253, 255, 257, 259 have configurations similar to that of the removal roll 177 according to the first embodiment.

The second portion 249 comprises a support plate 265, a support plate 267, a support plate 269, a support plate 271, removal rolls 273, 275, 277, 279, springs 281, 283, 285, 287, and a weight 289. The removal rolls 273, 275, 277, 279 correspond to recovery rolls. The support plate 265 comprises a plate-shaped member. The support plate 265 is L-shaped. The support plate 265 comprises a main body portion 265A extending vertically and a lever portion 265B extending transversally.

The support plate 265 is attached to a wall or the like (not shown), so as to be rotatable around a rotational shaft 291.

The rotational shaft 291 is located in a vicinity of an upper end of the main body portion 265A. An axial direction of the rotational shaft 291 is horizontal and parallel to the width direction W of the electrode 1 conveyed by the conveyor roller group.

The weight 289 is attached to the lever portion 265B. The support plate 265 is biased by means of the weight 289, so as to be rotatable in an A-direction in which the removal rolls 273, 275, 277, 279 come closer to the electrode 1.

The support plate 267 comprises a plate-shaped member having a U-shape. The support plate 267 comprises a central portion 267A, a first arm portion 267B and a second arm portion 267C. The central portion 267A extends vertically. The first arm portion 267B extends toward the electrode 1 from a start point that is down by one-fourth the height of the central portion 267A from an upper end of the central portion 267A. The second arm portion 267C extends toward the electrode 1 from a start point that is up by one-fourth the height of the central portion 267A from a lower end of the central portion 267A. The support plate 267 is attached to the support plate 265 so as to be rotatable around a rotational shaft 295. The rotational shaft 295 is located in the center of the central portion 267A in the vertical direction. An axial direction of the rotational shaft 295 is horizontal and parallel to the width direction W of the electrode 1 conveyed by the conveyor roller group.

The support plate 269 comprises a plate-shaped member extending vertically. The support plate 269 is attached to the first arm portion 267B so as to be rotatable around a rotational shaft 297. The support plate 271 comprises a plate-shaped member extending vertically. The support plate 271 is attached to the second arm portion 267C so as to be rotatable around a rotational shaft 299. Axial directions of the rotational shafts 297, 299 are horizontal and parallel to the width direction W of the electrode 1 conveyed by the conveyor roller group.

Removal rolls 273, 275 are rotatably attached to the support plate 269. In a first state, the removal rolls 273, 275 are in contact with the electrode 1. In the first state, the removal rolls 273, 275 are aligned along the longitudinal direction of the electrode 1. Axial directions of the removal rolls 273, 275 are horizontal and parallel to the width direction W of the electrode 1 conveyed by the conveyor roller group. The removal rolls 273, 275 have configurations similar to that of the removal roll 191 according to the first embodiment.

Removal rolls 277, 279 are rotatably attached to the support plate 271. In the first state, the removal rolls 277, 279 are in contact with the electrode 1. In the first state, the removal rolls 277, 279 are aligned along the longitudinal direction of the electrode 1. Axial directions of the removal rolls 277, 279 are horizontal and parallel to the width direction W of the electrode 1 conveyed by the conveyor roller group. The removal rolls 277, 279 have configurations similar to that of the removal roll 191 according to the first embodiment.

One end of a spring 281 is fixed to the support plate 267. The opposite end of the spring 281 is in contact with a part of the support plate 269 that supports the removal roll 273. The spring 281 biases the removal roll 273 toward the electrode 1.

One end of a spring 283 is fixed to the support plate 267. The opposite end of the spring 283 is in contact with a part of the support plate 269 that supports the removal roll 275. The spring 283 biases the removal roll 275 toward the electrode 1.

One end of a spring 285 is fixed to the support plate 267. The opposite end of the spring 285 is in contact with a part of the support plate 271 that supports the removal roll 277. The spring 285 biases the removal roll 277 toward the electrode 1.

One end of a spring 287 is fixed to the support plate 267. The opposite end of the spring 287 is in contact with a part of the support plate 271 that supports the removal roll 279. The spring 287 biases the removal roll 279 toward the electrode 1.

The droplet guide 241 is arranged below the first portion 247. The droplet guide 241 returns the liquid dripping from the first portion 247 back to each of the doping baths 17, 19, 21. The droplet guide 243 is arranged below the second portion 249. The droplet guide 243 returns the liquid dripping from the second portion 249 back to each of the doping baths 17, 19, 21.

2. Effects Achieved by Doping System 11

According to the fifth embodiment detailed above, the above-described effects of the first embodiment as well as the following effects are achieved.

(5A) The doping system 11 comprises the removal rolls 253, 255, 257, 259 aligned along the longitudinal direction of the electrode 1. Further, the doping system 11 comprises the removal rolls 273, 275, 277, 279 aligned along the longitudinal direction of the electrode 1. This enables the doping system 11 to further reduce the amount of the liquid carried away from the doping baths 17, 19, 21, the electrolyte solution treatment bath 15, and the cleaning bath 23 by the electrode 1.

(5B) The removal rolls 273, 275 are rotatable about the rotational shaft 297 with respect to the support plate 267. The removal rolls 277, 279 are rotatable around the rotational shaft 299 with respect to the support plate 267. Further, the support plate 267 is rotatable around the rotational shaft 295 with respect to the support plate 265. The doping system 11 thus makes it easier to adjust a pressure at the time when the removal rolls 273, 275, 277, 279 contact the electrode 1.

Other Embodiments

Although several embodiments of the present disclosure have been described as above, the present disclosure is not limited to the above-described embodiments, but may be practiced in various modified forms.

(1) The recovery unit 119 may have a configuration without the removal rolls 177, 191. For example, the recovery unit 119 may include members other than the rolls, and such members may be pressed against the electrode 1. Further, the recovery unit 119 may remove a liquid from the electrode 1 by, for example, blowing air toward the electrode 1 or vibrating the electrode 1, thereby returning the liquid to the bath.

(2) The materials for forming the removal rolls 177, 191 may include inelastic materials or solid materials. The solid materials mean dense materials or low porosity materials. Examples of the solid materials include polyethylene resin, polypropylene resin, polytetrafluoroethylene resin, and polyetheretherketone resin.

(3) Other methods may be employed for biasing the rotating portion 173 in the X-direction. For example, the rotating portion 173 may be biased in the X-direction by using the elastic force of a spring.

(4) In each of the above-described embodiments, the power supply, the conveyor rollers, and the counter electrode units are connected in a mode that the conveyor rollers and the counter electrode units are connected to the power supply, which is different for each doping bath. However, other modes of connection may be employed. For example, a counter electrode unit facing one surface of the electrode 1 and another counter electrode unit facing the other surface of the electrode 1 may be connected to power supplies different from each other respectively (such connection mode will be hereinafter referred to as a "mode A"). In the mode A, amounts of the alkali metal doped in the surfaces of the electrode 1 are equalized.

In the mode A, the counter electrode units 137, 143 provided in the upstream bath 131 of the doping bath 17 are connected to one polarity of the power supply 109. The counter electrode units 139, 141 are connected to one polarity of the power supply 110. The counter electrode units 137, 143 provided in the downstream bath 133 of the doping bath 17 are connected to the other polarity of the power supply 109. The counter electrode units 139, 141 are connected to the other polarity of the power supply 110.

Further, the counter electrode units 137, 143 provided in the upstream bath 131 of the doping bath 19 are connected to one polarity of the power supply 111. The counter electrode units 139, 141 are connected to one polarity of the power supply 112. The counter electrode units 137, 143 provided in the downstream bath 133 of the doping bath 19 are connected to the other polarity of the power supply 111. The counter electrode units 139, 141 are connected to the other polarity of the power supply 112.

Furthermore, the counter electrode units 137, 143 provided in the upstream bath 131 of the doping bath 21 are connected to one polarity of the power supply 113. The counter electrode units 139, 141 are connected to one polarity of the power supply 114. The counter electrode units 137, 143 provided in the downstream bath 133 of the doping bath 21 are connected to the other polarity of the power supply 113. The counter electrode units 139, 141 are connected to the other polarity of the power supply 114.

In the conveyor roller group, the conveyor rollers 37, 41, 43, 47, 49, 53, 55, 59, 61, 65, 67, 71 are made of an electrically conductive material. The remaining conveyor rollers in the conveyor roller group are each made of elastomer except for the bearing portions thereof.

One terminal of the power supply 109 is connected to the conveyor rollers 37, 41, 43, 47. The other terminal of the power supply 109 is connected to the counter electrode units 137, 143 provided in the upstream bath 131 and the downstream bath 133 of the doping bath 17. The electrode 1 comes into contact with the conveyor rollers 37, 41, 43, 47. The electrode 1 and the counter electrode units 137, 143 are disposed in the dope solution that is the electrolyte solution. Thus, the electrode 1 and the counter electrode units 137, 143 are electrically connected to each other through the electrolyte solution in the upstream bath 131 and the downstream bath 133 of the doping bath 17.

One terminal of the power supply 110 is connected to the conveyor rollers 37, 41, 43, 47. The other terminal of the power supply 110 is connected to the counter electrode units 139, 141 provided in the upstream bath 131 and the downstream bath 133 of the doping bath 17. The electrode 1 comes into contact with the conveyor rollers 41, 47. The electrode 1 and the counter electrode units 139, 141 are disposed in the dope solution that is the electrolyte solution. Thus, the electrode 1 and the counter electrode units 139, 141 are electrically connected to each other through the electrolyte solution in the upstream bath 131 and the downstream bath 133 of the doping bath 17.

As described above, in the mode A, the counter electrode units 137, 143 facing one surface of the electrode 1 are connected to one terminal of the power supply 109, and the counter electrode units 139, 141 facing the other surface of the electrode 1 are connected to one terminal of the power supply 110, respectively. Thus, the amount of the alkali metal doped in a front side of the electrode 1 and the amount of the alkali metal doped in a back side of the electrode 1 are controlled to be equal to each other.

One terminal of the power supply 111 is connected to the conveyor rollers 49, 53, 55, 59. The other terminal of the power supply 111 is connected to the counter electrode units 137, 143 provided in the upstream bath 131 and the downstream bath 133 of the doping bath 19. The electrode 1 comes into contact with the conveyor rollers 49, 53, 55, 59. The electrode 1 and the counter electrode units 137, 143 are disposed in the dope solution that is the electrolyte solution. Thus, the electrode 1 and the counter electrode units 137, 143 are electrically connected to each other through the electrolyte solution in the upstream bath 131 and the downstream bath 133 of the doping bath 19.

One terminal of the power supply 112 is connected to the conveyor rollers 49, 53, 55, 59. The other terminal of the power supply 112 is connected to the counter electrode units 139, 141 provided in the upstream bath 131 and the downstream bath 133 of the doping bath 19. The electrode 1 comes into contact with the conveyor rollers 49, 53, 55, 59. The electrode 1 and the counter electrode units 139, 141 are disposed in the dope solution that is the electrolyte solution. Thus, the electrode 1 and the counter electrode units 139, 141 are electrically connected to each other through the electrolyte solution in the upstream bath 131 and the downstream bath 133 of the doping bath 19.

As described above, in the mode A, the counter electrode units 137, 143 facing one surface of the electrode 1 are connected to one terminal of the power supply 111, and the counter electrode units 139, 141 facing the other surface of the electrode 1 are connected to the other terminal of the power supply 112, respectively. Thus, an amount of alkali metal doped in a front side of the electrode 1 and an amount of the alkali metal doped in a back side of the electrode 1 are controlled to be equal to each other.

One terminal of the power supply 113 is connected to the conveyor rollers 61, 65, 67, 71. The other terminal of the power supply 113 is connected to the counter electrode units 137, 143 provided in the upstream bath 131 and the downstream bath 133 of the doping bath 21. The electrode 1 comes into contact with the conveyor rollers 61, 65, 67, 71. The electrode 1 and the counter electrode units 137, 143 are disposed in the dope solution that is the electrolyte solution. Thus, the electrode 1 and the counter electrode units 137, 143 are electrically connected to each other through the electrolyte solution in the upstream bath 131 and the downstream bath 133 of the doping bath 21.

One terminal of the power supply 114 is connected to the conveyor rollers 61, 65, 67, 71. The other terminal of the power supply 114 is connected to the counter electrode units 139, 141 provided in the doping bath 21. The electrode 1 comes into contact with the conveyor rollers 61, 65, 67, 71. The electrode 1 and the counter electrode units 139, 141 are disposed in the dope solution that is the electrolyte solution. Thus, the electrode 1 and the counter electrode units 139, 141 are electrically connected to each other through the electrolyte solution in the doping bath 21.

As described above, in the mode A, the counter electrode units 137, 143 facing one surface of the electrode 1 are connected to one terminal of the power supply 113, and the counter electrode units 139, 141 facing the other surface of the electrode 1 are connected to the other terminal of the power supply 114, respectively. Thus, an amount of alkali metal doped in a front side of the electrode 1 and an amount of alkali metal doped in a back side of the electrode 1 are controlled to be equal to each other.

(5) A function served by a single element in any of the above-described embodiments may be achieved by a plurality of elements, or a function served by a plurality of elements may be achieved by a single element. Also, a part of a configuration in any of the above-described embodiments may be omitted. Further, at least a part of a configuration in any of the above-described embodiments may be added to, or replace, a configuration in another of the embodiments.

(6) In addition to the doping system described above, the present disclosure may be realized in various forms, including a system having the doping system as a configuration element, a program for making a computer function as a controller of the doping system, a non-transitory tangible storage medium such as a semiconductor memory in which the program is stored, and a doping method, an electrode manufacturing method, an electrode manufacturing method, or the like.

EXAMPLES (Manufacturing of Electrode 1 to be Used in Each Example and Comparative Example 1)

The current collector 3 having a long strip-like shape was prepared. The current collector 3 was a negative electrode current collector. The current collector 3 had a dimension of a width of 150 mm, a length of 100 m, and a thickness of 8 μm. The current collector 3 had a surface roughness Ra of 0.1 μm. The current collector 3 was made of a copper foil. Negative electrode active material layers 5 were each formed on both sides of the current collector 3.

A coating amount of the negative electrode active material layer 5 formed on one side of the current collector 3 was 50 g/m². The negative electrode active material layer 5 was formed along a longitudinal direction of the current collector 3. The negative electrode active material layer 5 was formed over a width of 130 mm from one end of the current collector 3 in the width direction. At the other end in the width direction W of the current collector 3, a negative electrode active material layer non-forming section had a width of 20 mm. The negative electrode active material layer non-forming section indicates a section where the negative electrode active material layer 5 was not formed. Next, a drying process and a pressing process were performed, and thereby the electrode 1 was obtained.

The negative electrode active material layer 5 contained a negative electrode active material, carboxymethyl cellulose, acetylene black, a binder and a dispersant at a mass ratio of 88:3:5:3:1. The negative electrode active material was a mixture of a Silicon-based active material and a graphite-based active material. The negative electrode active material contained the silicon-based active material and the graphite-based active material at a mass ratio of 2:8. The acetylene black corresponds to a conductive agent.

The doping system 11 shown in FIG. 3 was prepared, and the electrode 1 was fed therethrough. The counter electrode units 139, 141, 143 were provided in each of the doping baths 17, 19, 21. Next, the electrolyte solution was supplied to the doping baths 17, 19, 21. The electrolytic solution was a solution including 1.0 M of $LiPF_6$. The solvent of the electrolytic solution was a mixed liquid including EC (ethylene carbonate), EMC (ethyl methyl carbonate), and DMC (dimethyl carbonate) at a volume ratio of 1:1:1.

Next, the electrode 1 fed through the doping system 11 and the counter electrode units 139, 141, 143 were connected to a direct current power source having a current/voltage monitor, and then electric current of 5 A was conducted while the electrode 1 was conveyed at a speed of 0.1 m/min. At the time, a center of a negative electrode active material layer 95 of the electrode 1 in the width direction W coincided with a center of a lithium metal plate of the counter electrode unit 51 in the width direction W. Considering the irreversible capacity, an energization time was set to a time at which a lithium doping ratio in the negative electrode active material layer 5 was 15% of a discharge capacity C2 of a negative electrode.

The irreversible capacity was estimated in advance by measuring the discharge capacity of the electrode 1 after doping the lithium. By this process, the negative electrode active material in the negative electrode active material layer 95 was doped with the lithium, and thereby the electrode 1 became a pre-doped negative electrode. The electrode 1 is a negative electrode for a lithium-ion rechargeable battery.

The electrode 1 was passed through a cleaning bath 7, and then was wound. The cleaning bath 7 had stored dimethyl carbonate (DMC) at 25° C. in advance. Thus, the pre-doped electrode 1 was manufactured.

Example 1

The electrode 1 as manufactured above was fed through the doping system 11 again. In addition, the electrolyte solution was supplied to the doping baths 17, 19, 21. Materials of the removal roll 177 and the removal roll 191 were EPDM (ethylene propylene diene rubber). The pressure at which the removal roll 177 and the removal roll 191 pressurize the electrode 1 was set to 57.5 g/cm$^2$.

The electrode 1 was conveyed at a speed of 3 m/min for 30 minutes. When passing through the recovery unit 119, the electrode 1 was held between the removal rolls 177, 191. In the doping baths 17, 19, 21, a decreased amount of the electrolyte solution was 323 g. The decreased amount of the electrolyte solution per meter of the electrode 1 was 10.8 g/m.

Example 2

An operation similar to that of Example 1 was basically performed on Example 2. However, the pressure at which the removal roll 177 and the removal roll 191 pressurize the electrode 1 was set to 139.2 g/cm$^2$. In the doping baths 17, 19, 21, the decreased amount of the electrolyte solution was set to 209 g. The decreased amount of the electrolyte solution per meter of the electrode 1 was 7.0 g/m. A possible reason why the decreased amount of the electrolyte solution of Example 2 was relatively smaller than that of Example 1 is that an increased pressure at which the removal roll 177 and the removal roll 191 pressurize the electrode 1 improved contact of the removal roll 177 and the removal roll 191 with the electrode 1, whereby much more electrolyte solution returned to the doping baths 17, 19, 21.

Example 3

An operation similar to that of Example 1 was basically performed on Example 3. However, the material of the removal roll 177 and the removal roll 191 was an olefin sponge. In the doping baths 17, 19, 21, the decreased amount of the electrolyte solution was set to 230 g. The decreased amount of the electrolyte solution per meter of the electrode 1 was 7.7 g/m. A possible reason why the decreased amount of the electrolyte solution of Example 3 was relatively smaller than that of Example 1 is that the removal roll 177 and the removal roll 191 were made of an olefin sponge and, by using the olefin sponge, contact of the removal roll 177 and the removal roll 191 with the electrode 1 was improved even if the pressure at which the removal roll 177 and the removal roll 191 pressurize the electrode 1 was low, whereby much more electrolyte solution was returned to the doping baths 17, 19, 21.

Further, compared to Example 2, the decreased amount of the electrolyte solution of Example 3 was not considerably changed. The possible reason is that, under conditions of Example 2 and Example 3, most of the electrolyte solution adhered to the surface of the electrode 1, except for the electrolyte solution impregnated into the electrode 1, was squeezed by the removal roll 177 and the removal roll 191, and then returned to the doping baths 17, 19, 21.

Example 4

An operation similar to that of Example 3 was basically performed on Example 4. However, the pressure at which the removal roll 177 and the removal roll 191 pressurize the electrode 1 was set to 139.2 g/cm$^2$. In the doping baths 17, 19, 21, the decreased amount of the electrolyte solution was 221 g. The decreased amount of the electrolyte solution per meter of the electrode 1 was 7.4 g/m.

From the results above, it was found that, in the case where the olefin sponge is used as the material for the removal roll 177 and the removal roll 191, changes in pressure at which the removal roll 177 and the removal roll 191 pressurize the electrode 1 produce no great difference in the decreased amount of electrolyte solution. It may be because even if the pressure at which the removal roll 177 and the removal roll 191 made of the olefin sponge pressurize the electrode 1 is low, the electrolyte solution on the surface of the electrode 1 can be removed sufficiently and returned to the doping baths 17, 19, 21.

Comparative Example 1

Basically, an operation similar to that of Example 1 was performed on the comparative example 1. However, the removal roll 177 and the removal roll 191 were not used. In the doping baths 17, 19, 21, the decreased amount of electrolyte solution was 840 g. The decreased amount of the electrolyte solution per meter of the electrode 1 was 28 g/m. From the results above, it was found that the decreased amount of the electrolyte solution was double or more when the removal roll 177 and the removal roll 191 were not used at a speed of 3 m/min for conveying, compared to Example 1.

The invention claimed is:

1. A doping method of doping an active material with an alkali metal using a doping system, the active material being contained in a layer of a strip-shaped electrode, wherein the doping system comprises:
  a doping bath configured to store a solution containing alkali metal ions;
  a conveyor unit configured to convey the electrode along a path passing through the doping bath;
  a counter electrode unit configured to be housed in the doping bath;

a connection unit configured to electrically connect a conveyor roller provided in the conveyor unit with the counter electrode unit; and a recovery unit configured to collect in the doping bath the solution adhered to the electrode having passed through the doping bath.

2. The doping method according to claim 1, wherein the recovery unit comprises a recovery roll configured to collect the solution from the electrode.

3. The doping method according to claim 2, wherein the recovery roll is configured to pressurize the electrode.

4. The doping method according to claim 3, wherein a pressure at which the recovery roll pressurizes the electrode ranges from 0.1 g/cm2 to 100 kg/cm2.

5. The doping method according to claim 2, wherein at least a part of the recovery roll is formed of an elastic material.

6. The doping method according to claim 2, wherein at least a part of the recovery roll is formed of a porous material.

7. The doping method according to claim 2, wherein at least a part of the recovery roll is formed of a solid material.

8. The doping method according to claim 2, wherein the doping system further comprises a cleaning unit configured to clean a surface of the recovery roll.

9. The doping method according to claim 2, wherein the doping system comprises two or more recovery rolls.

10. The doping method according to claim 1, wherein the doping system further comprises a cleaning bath configured to store a cleaning liquid,
    wherein the path passes through the cleaning bath after passing through the doping bath, and
    wherein the doping system further comprises a recovery unit for the cleaning bath configured to collect in the cleaning bath the cleaning liquid adhered to the electrode having passed through the cleaning bath.

11. The doping method according to claim 1, wherein the doping system further comprises an electrolyte solution treatment bath configured to store an electrolyte solution,
    wherein the path passes thorough the electrolyte solution treatment bath before passing through the doping bath, and
    wherein the doping system further comprises a recovery unit for the electrolyte solution treatment bath configured to collect in the electrolyte solution treatment bath the electrolyte solution adhered to the electrode having passed through the electrolyte solution treatment bath.

12. A doping system for doping an active material with an alkali metal, the active material being contained in a layer of a strip-shaped electrode, the doping system comprising:
    a doping bath configured to store a solution containing alkali metal ions;
    a conveyor unit configured to convey the electrode along a path passing through the doping bath;
    a counter electrode unit configured to be housed in the doping bath;
    a connection unit configured to electrically connect a conveyor roller provided in the conveyor unit with the counter electrode unit; and
    a recovery unit configured to collect in the doping bath the solution adhered to the electrode having passed through the doping bath.

13. The doping system according to claim 12, wherein the recovery unit comprises a recovery roll configured to collect the solution from the electrode.

14. The doping system according to claim 13, wherein the recovery roll is configured to pressurize the electrode.

15. The doping system according to claim 14, wherein a pressure at which the recovery roll pressurizes the electrode ranges from 0.1 g/cm2 to 100 kg/cm2.

16. The doping system according to claim 13, wherein at least a part of the recovery roll is formed of an elastic material.

17. The doping system according to claim 13, wherein at least a part of the recovery roll is formed of a porous material.

18. The doping system according to claim 13, wherein at least a part of the recovery roll is formed of a solid material.

19. The doping system according to claim 13, further comprising a cleaning unit configured to clean a surface of the recovery roll.

20. The doping system according to claim 13, wherein the doping system comprises two or more recovery rolls.

21. The doping system according to claim 12, further comprising a cleaning bath configured to store a cleaning liquid,
    wherein the path passes through the cleaning bath after passing through the doping bath, and
    wherein the doping system further comprises a recovery unit for the cleaning bath configured to collect in the cleaning bath the cleaning liquid adhered to the electrode having passed through the cleaning bath.

22. The doping system according to claim 12, further comprising an electrolyte solution treatment bath configured to store an electrolyte solution,
    wherein the path passes through the electrolyte solution treatment bath before passing through the doping bath, and
    wherein the doping system further comprises a recovery unit for the electrolyte solution treatment bath configured to collect in the electrolyte solution treatment bath the electrolyte solution adhered to the electrode having passed through the electrolyte solution treatment bath.

\* \* \* \* \*